United States Patent
Mueller et al.

(10) Patent No.: US 7,198,233 B1
(45) Date of Patent: Apr. 3, 2007

(54) REUSABLE ORBITAL VEHICLE WITH INTERCHANGEABLE CARGO MODULES

(75) Inventors: George E. Mueller, Kirkland, WA (US); Richard H. Kohrs, Kirkland, WA (US); William B. Duncan, Kirkland, WA (US); David B. Cochran, Duvall, WA (US); Dean L. Misterek, Seattle, WA (US); Terill L. Burlison, Kent, WA (US); Ryan M. Curtis, Seattle, WA (US); Thomas Johnson, Bothell, WA (US); Richard A. Bailey, Canyon Country, CA (US); Charles D. Limerick, Issaquah, WA (US)

(73) Assignee: Kistler Aerospace Corporation, Kirkland, WA (US)

( * ) Notice: Subject to any disclaimer, the term of this patent is extended or adjusted under 35 U.S.C. 154(b) by 0 days.

(21) Appl. No.: 11/230,051

(22) Filed: Sep. 19, 2005

(51) Int. Cl.
*F03H 5/00* (2006.01)
(52) U.S. Cl. .................................... 244/172
(58) Field of Classification Search ............ 244/172.4, 244/173.1, 173.3, 136, 137.1, 158.1; 414/477, 414/485, 468
See application file for complete search history.

(56) References Cited

U.S. PATENT DOCUMENTS

| | | | | |
|---|---|---|---|---|
| 3,534,686 A * | 10/1970 | Watson | ................ | 102/378 |
| 3,608,484 A * | 9/1971 | Cantor et al. | .......... | 244/172.4 |
| 3,907,225 A * | 9/1975 | Welther | .............. | 244/173.3 |
| 4,809,936 A * | 3/1989 | Whitaker | ............. | 244/172.4 |
| 4,842,223 A * | 6/1989 | Allton et al. | ............. | 244/158.1 |
| 4,974,796 A * | 12/1990 | Carr et al. | .............. | 244/137.1 |
| 5,305,970 A * | 4/1994 | Porter et al. | ............. | 244/172.2 |
| 5,411,226 A * | 5/1995 | Jones et al. | ............... | 244/173.3 |
| 5,605,308 A * | 2/1997 | Quan et al. | .............. | 244/173.3 |
| 5,628,476 A * | 5/1997 | Soranno et al. | ........... | 244/172.1 |
| 5,720,450 A * | 2/1998 | Kanne | ..................... | 244/173.1 |
| 5,927,653 A * | 7/1999 | Mueller et al. | .......... | 244/171.3 |
| 6,053,454 A * | 4/2000 | Smolik et al. | ........... | 244/173.1 |
| 6,059,234 A * | 5/2000 | Mueller et al. | .......... | 244/173.1 |
| 6,082,676 A * | 7/2000 | Cochran | ................. | 244/172.3 |
| 6,138,951 A * | 10/2000 | Budris et al. | ............ | 244/173.3 |
| 6,158,693 A * | 12/2000 | Mueller et al. | .......... | 244/158.9 |
| 6,276,639 B1 * | 8/2001 | Hornung et al. | .......... | 244/173.3 |
| 6,290,275 B1 * | 9/2001 | Braam et al. | ............. | 294/86.4 |
| 6,296,206 B1 * | 10/2001 | Chamness et al. | ....... | 244/173.3 |
| 6,354,540 B1 * | 3/2002 | Lewis et al. | ............. | 244/172.4 |
| 6,416,018 B2 * | 7/2002 | DiVerde et al. | .......... | 244/137.1 |
| 6,513,760 B1 * | 2/2003 | Mueller et al. | .......... | 244/171.1 |
| 6,789,767 B2 * | 9/2004 | Mueller et al. | .......... | 244/173.3 |
| 2002/0000495 A1 * | 1/2002 | Diverde et al. | .......... | 244/137.1 |
| 2002/0079406 A1 * | 6/2002 | Kroeker | ................. | 244/158 R |

\* cited by examiner

*Primary Examiner*—Teri Pham Luu
*Assistant Examiner*—S. A. Holzen
(74) *Attorney, Agent, or Firm*—Michael J. Donohue; Davis Wright Tremaine LLP

(57) ABSTRACT

A reusable module is affixed atop a reusable orbital vehicle (OV). Various configurations of the reusable module have identical external dimensions in the region of attachment to the OV to permit interchangeability. Different configurations can accommodate a variety of missions of different type and duration. A variety of cargo modules of different configurations allow cargo to be uplifted into orbit. In one embodiment, the cargo module is an unpressurized cargo module in which the cargo is exposed to the environment of space during the unloading process. The cargo module may also be a pressurized cargo module. In an alternative embodiment, the cargo module may include both a pressurized cargo module and unpressurized cargo module.

21 Claims, 18 Drawing Sheets

REUSABLE ORBITAL VEHICLE WITH INTERCHANGEABLE CARGO MODULES

BACKGROUND OF THE INVENTION

1. Field of the Invention

The present invention is directed generally to rockets, and, more particularly, to a reusable orbital vehicle and reusable cargo module.

2. Description of the Related Art

The modern space age may be thought of as beginning on Oct. 4, 1957 with the launch of Sputnik I. From that time until the launch of the first space shuttle in 1981, all portions of the space vehicle were expendable. That is, no parts were reused in subsequent missions.

With the advent of the space shuttle, the solid rocket boosters and orbital vehicle itself were recycled for use in subsequent missions. The large external fuel tank burns up on re-entry and is not recycled. Even with the reusable portions of the space shuttle, the launch cost and operational cost of the space shuttle is significant.

Virtually all satellites, such as communications satellites, weather satellites, and the like, are currently launched on expensive, expendable launch vehicles that are discarded after placing their payloads into orbit. Similarly, orbital vehicles that currently supply the international space station (ISS) are typically expendable vehicles. That is, the booster rocket that places the orbital vehicle into low earth orbit burns up upon re-entry. After providing supplies to the ISS, the orbital vehicle is not reusable.

At present, the space shuttle is the only reusable vehicle for uplifting cargo into orbit. Despite the recycling of some components, those skilled in the art will appreciate that the operation of the space shuttle presents a significant cost burden. Therefore, it can be appreciated that there is a significant need for a system and method for a reusable space vehicle that allows cargo to be placed in orbit. The present invention provides this and other advantages as will be apparent from the following detailed description and accompanying figures.

BRIEF DESCRIPTION OF THE SEVERAL VIEWS OF THE DRAWING(S)

DETAILED DESCRIPTION OF THE INVENTION

A reusable cargo module having selected standardized dimensions is designed to fit atop a reusable orbital vehicle to provide low cost delivery and retrieval of cargo into orbit. Although other suitable launch vehicles are possible, the reusable space launch vehicle 100, shown in FIG. 1, may be satisfactorily implemented by the Kistler K-1 vehicle. The space launch vehicle 100 comprises a launch assist platform (LAP) 102, which is sometimes referred to as a booster rocket. An orbital vehicle (OV) 104 is mounted atop the LAP 102. The Kistler K-1 vehicle utilizes three LAP engines 106. Fuel is supplied to the LAP engines 106 from LAP fuel tanks 108. In a typical implementation, separate fuel tanks contain rocket propellant and liquid oxygen (LOX). Operation of the LAP engines 106 and LAP fuel tanks 108 is known to one skilled in the art and need not be described in greater detail herein. The LAP 102 also contains avionics hardware, such as a vehicle computer, GPS, guidance system, transmitter(s), receiver(s), FAA transponder, and the like. Appropriate avionics software is used by portions of the avionics hardware, such as the vehicle computer. Operational details of these elements is known in the art, and need not be described in greater detail herein.

In an exemplary embodiment, the Kistler K-1 is designed for terrestrial launch and landing. The LAP 102 also includes parachutes and airbags to assist in recovery of the LAP. The launch and recovery of the LAP 102 is illustrated in U.S. Pat. No. 6,158,693, which is assigned to the assignee of the present disclosure. U.S. Pat. No. 6,158,693 is incorporated herein by reference in its entirety.

In an exemplary embodiment, the LAP 102 provides an initial boost to a predetermined altitude of approximately 135,000 feet. The space launch vehicle 100 initiates a separation of the LAP 102 and the OV 104. Following separation, the center engine of the LAP engines 106 fires to provide a controlled return trajectory to the initial launch site or designated alternative landing site. At an altitude of approximately 17,000 feet the LAP 102 deploys parachutes (not shown) and airbags (not shown) to provide a soft landing at the launch site. The LAP 102 is designed to return to the launch area approximately eleven minutes after liftoff.

Figure 1:
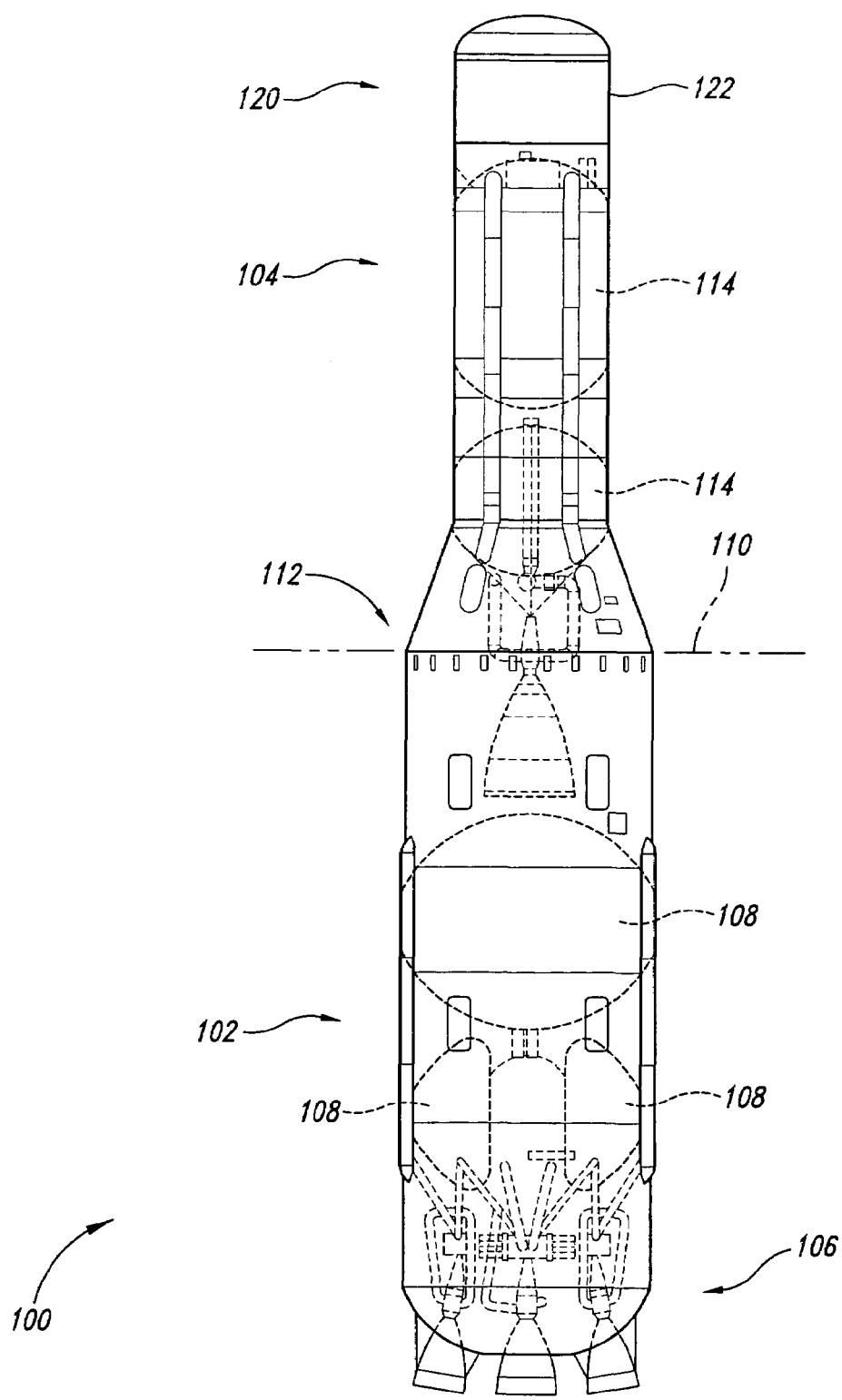
FIG. 1 is an elevation view of a space launch vehicle.

FIG. 1 illustrates a separation plane, shown by the reference numeral 110, that separates the OV 104 from the LAP 102. Known separation mechanisms, such as pneumatic bolts, may be utilized to separate the OV 104 from the LAP 102 at the predetermined altitude.

Following separation, an OV engine 112 ignites to place the OV 104 in earth orbit. The OV engine 112 is supplied with fuel from OV fuel tanks 114. In a typical implementation, the OV fuel tanks 114 provide separate storage for kerosene fuel and LOX oxidizer. Operational details of the OV engine 112 and OV fuel tanks 114 are known to those skilled in the art and need not be described in greater detail herein.

The OV 104 also contains avionics hardware, such as a vehicle computer, guidance system, transmitter(s), receiver(s), and the like. Appropriate avionics software operates on the avionics hardware. Operational details of the avionics hardware and software in the OV 104 are known to those skilled in the art, and need not be described in greater detail herein. The OV 104 is designed for automatic guidance to a rendezvous point in orbit. The rendezvous point may be a predetermined orbit, such as a location to rendezvous with a satellite or scientific instrument (e.g., the Hubble telescope). In an embodiment described herein, the OV is designed to rendezvous with another orbiting body, such as, by way of example, the International Space Station (ISS).

A module 120 sits atop the OV 104. In an exemplary embodiment, the module 120 comprises one of several different interchangeable modules having selected common dimensions, attachment structural elements and aerodynamic characteristics. In an embodiment described herein, the module 120 is implemented as a cargo module 122.

Figure 2:
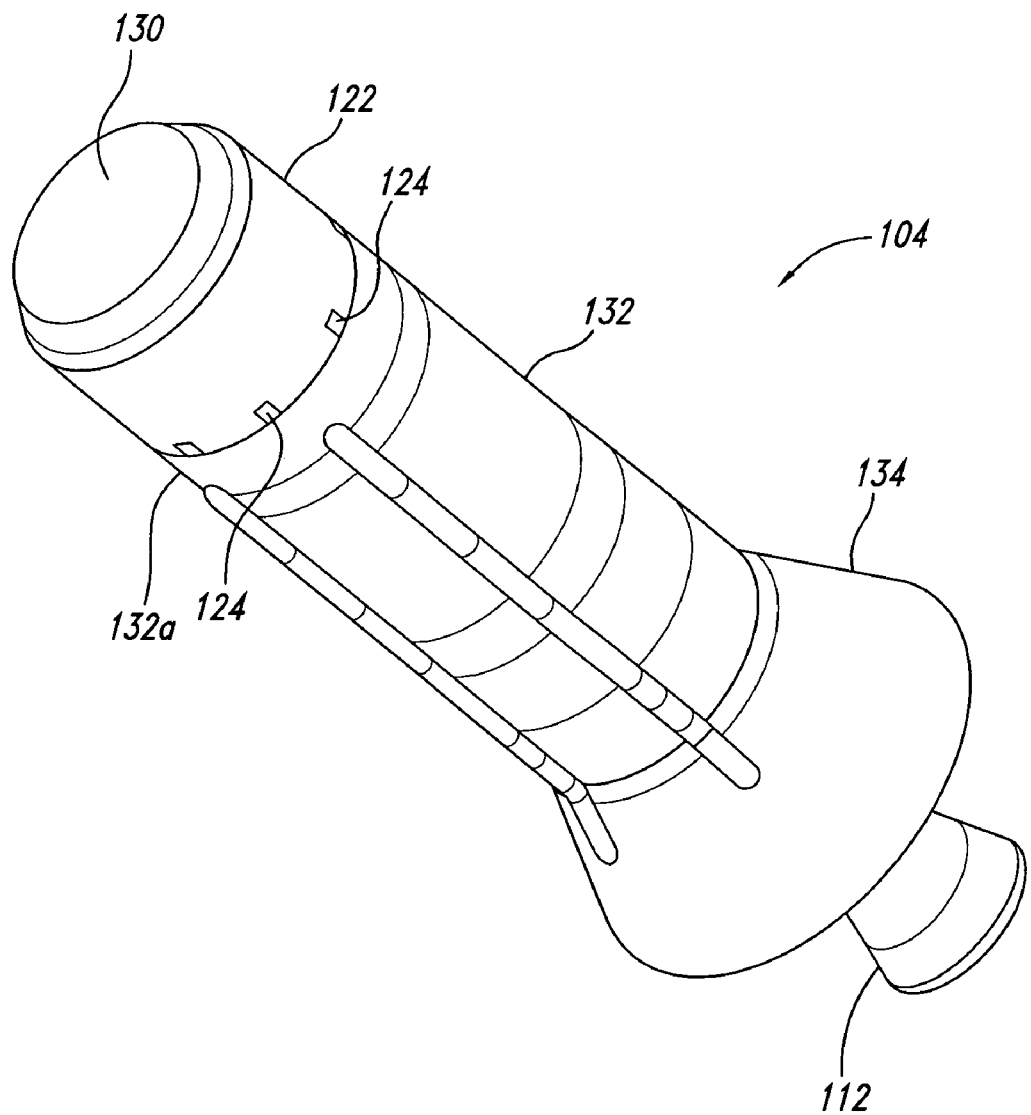
FIG. 2 is a perspective view of an orbital vehicle in a closed configuration.
Figure 3:
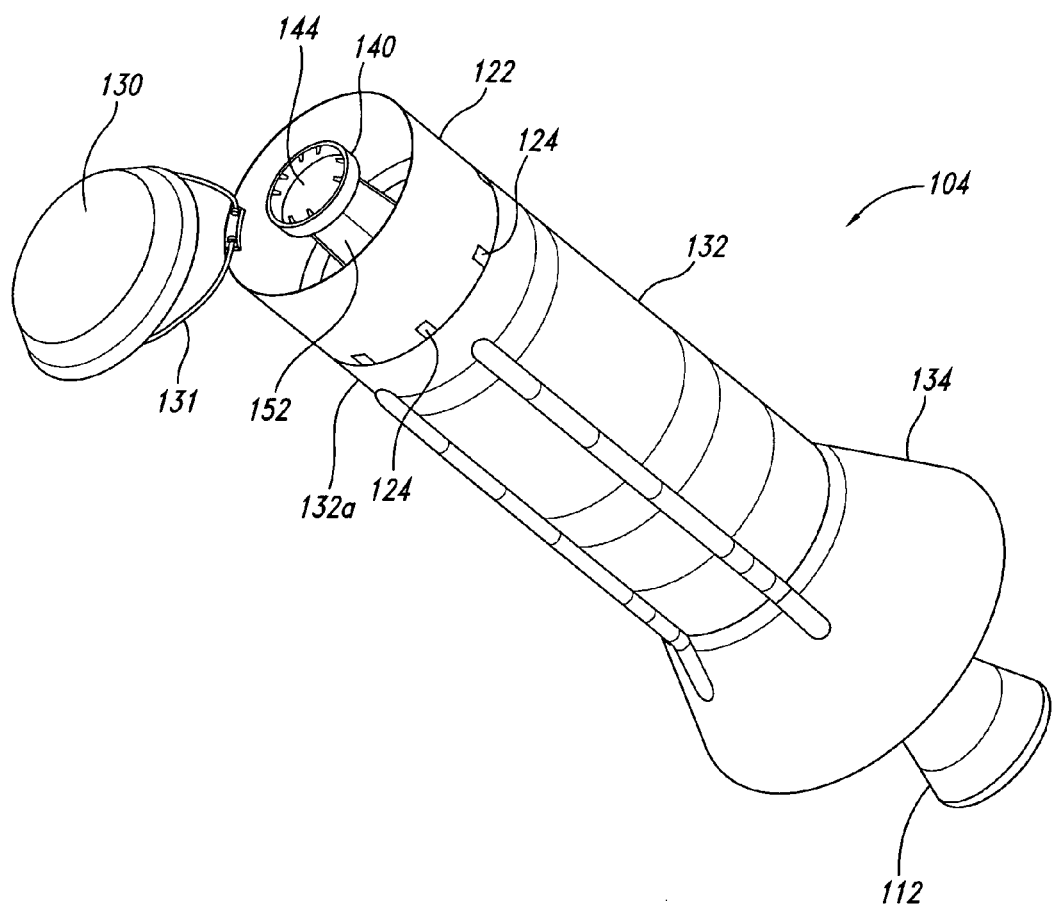
FIG. 3 is a perspective view of the orbital vehicle in an open configuration.

FIGS. 2–3 illustrate the OV 104 and cargo module 122 in greater detail. The OV 104 has a generally elongated cylindrical aerodynamic shape with the module 120 coupled to a first end and the OV engine 112 at the second end. A mid-body portion 132 is cylindrical in shape and contains the OV fuel tanks 114, as previously described. A forward-body portion 132a is cylindrical in shape and contains the OV avionics (not shown). An aft-flare or skirt 134 contains portions of the OV engine 112 and provides a transition from the smaller diameter of the OV 104 to the larger diameter of the LAP 102. The aft-flare 134 may also provide desirable aerodynamic characteristics for the OV 104.

The reusable LAP 102 and OV 104 advantageously permit the attachment of multiple different forms of modules 120, which include payload modules, cargo modules, and passenger modules, for example. A payload module may be used to carry cargo, such as satellites, that will be dispensed once the OV 104 has been placed in orbit. A pressurized passenger module may carry one or more persons into orbit. The passenger module may also carry a limited amount of cargo.

Several different forms of cargo modules will be described herein. In addition, the module 120 may take the form of a pressurized cargo module, an unpressurized cargo module, or a combination of the two. These forms of cargo modules may be used to deliver supplies to an orbiting vehicle, such as the ISS or other space station. A pressurized cargo module is sealed from the environment of space and pressurized. Cargo contained within a pressurized cargo module is transferred via a sealed hatchway. In contrast, an unpressurized cargo module need not be sealed from the environment of space. As will be described in greater detail below, cargo contained within an unpressurized cargo module is exposed to the environment of space during the cargo transfer process.

The module 120 is generally cylindrical in shape and may have varying dimensions, such as length, but has common dimensions and mounting characteristics at an orbital vehicle interface 124. These common dimensions and mounting characteristics advantageously permit the easy interchangeability of modules 120 atop the OV 104. Thus, the appropriate module 120 may be selected based on the specific mission parameters. The reusability of the LAP 102, OV 104 and interchangeable modules 120 provide great space launch flexibility and cost efficiency. For example one mission may provide supplies to the ISS or other space station. This mission may require the use of an unpressurized cargo module to deliver supplies to the ISS. A subsequent mission may deliver passengers to the ISS. One of a plurality of different passenger modules, appropriate for the mission parameters, is selected and mounted atop the OV 104. Thus, the operational features of the module 120 may vary from one mission to another. In additional to a variable length, the diameter of the module 120 may also vary except in the region of the orbital vehicle interface 124 to permit the interchangeability described above.

In one embodiment, the cargo module 122 is attached to the OV 104 using bolts at the orbital vehicle interface 124. If an emergency escape is required, such as during the launch mode, explosive bolts can be used that are fired to allow separation of the cargo module 122 from the OV 104. In an exemplary embodiment, the interior portion of the mid-body 132 is maintained at a positive air pressure sufficient to provide approximately 6 G separation of the cargo module 122 from the OV 104. The cargo module 122 is provided with parachutes to slow the descent and thereby provide a safe landing. The cargo module 122 may also include airbags to supplement those deployed on the OV 104. The airbags also serve to cushion the landing of the cargo module 122.

In an alternative embodiment, the cargo module 122 may be attached to the OV 104 using a releasable attachment mechanism. In this embodiment, the cargo module 122 may be detached from the OV 104 and left in orbit. For example, the cargo module 122 may dock with a space station and detach from the OV 104. The detached cargo module 122 may be temporarily left in orbit. The OV 104 may be reattached to the same cargo module 122 or some other module 120 for the return trip to earth. Thus, the interchangeability of the modules 120 may be useful on earth or in space.

The cargo module 122 is attached to the OV 104 by the orbital vehicle interface 124 as described above. The opposite end of the cargo module 122 comprises a nosecap 130. Once the launch phase of a mission has been completed and the OV 104 is placed in orbit, the nosecap 130 may be moved to an open position, as illustrated in FIG. 3. The nosecap 130 is placed in the closed position for launch and re-entry, but may be opened in the vacuum of space without any detrimental effects on the operation of the OV 104. The nosecap 130 is coupled to the cargo module 122 by an articulating wishbone hinge mechanism 131 that permits the nosecap to swing completely free of the terminal end of the cargo module 122. This permits easy access to the cargo contained within the cargo module 122. When the nosecap 130 is placed in the closed position, a series of latches (not shown) provide a tight seal that prevents damage to the interior portions of the cargo module 122 that may otherwise occur during the high heat of re-entry.

Figure 4:
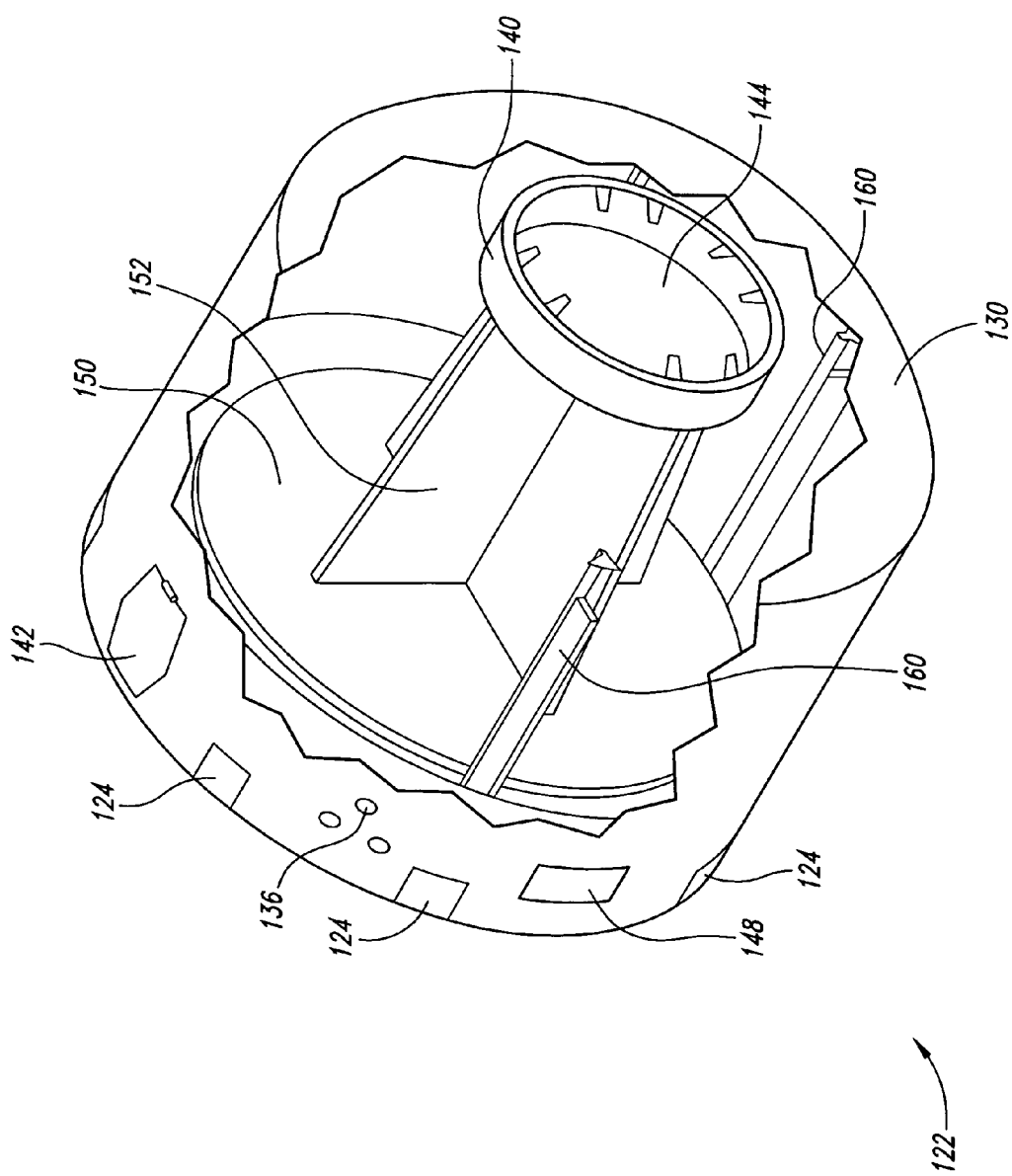
FIG. 4 is a partial cutaway perspective view of one embodiment of a cargo module with the nosecap closed.

FIG. 4 is a cutaway perspective view of the cargo module 122. For the sake of clarity, the nosecap 130 is not shown in FIG. 4. When the nosecap 130 is opened, it exposes a docking mechanism 140. The docking mechanism 140 permits coupling of the cargo module 122 to another orbiting body, such as the ISS. Those skilled in the art will appreciate that the docking mechanism 140 may be implemented in a variety of different forms. For example, the U.S. spacecraft often use a standardized commercial docking mechanism known as a common berthing mechanism (CBM). The CBM includes an active device that latches on to an incoming spacecraft and guides it into a locked position. In some implementations a grappling arm is included in addition to the CBM to capture the incoming spacecraft. Some docking mechanisms do not actively guide the incoming spacecraft but rely on the incoming spacecraft to guide itself into initial contact with the docking mechanism. Once the incoming spacecraft has guided itself into contact with the docking mechanism, latches secure the spacecraft. Other docking and/or berthing mechanisms are also known. The term "docking mechanism," as used herein, is intended to refer to any docking or berthing mechanism. The present system is not limited by the specific implementation of the docking mechanism.

A flight reusable grapple fixture (FRGF) 141 (see FIGS. 5–8) can be deployed to assist in docking the cargo module 122. During launch and re-entry, the FRGF 141 is protected behind an FRGF door 142. The docking mechanism 140 is mounted in the central area of a pressure bulkhead 144. The pressure bulkhead 144 is an integral structure in the cargo module 122 and provides a solid support for the docking mechanism 140.

FIG. 4 also illustrates thrusters 136 that are part of an attitude control system (ACS). The thrusters 136 operate in a conventional manner to adjust the attitude of the cargo module 122 and to provide maneuvering power. In an exemplary embodiment, four sets of the thrusters 136 are provided in spaced apart positions along the periphery of the cargo module 122 near the orbital vehicle interface 124.

As can be seen in FIG. 4, the cargo module 122 includes a cargo platform 150. A cargo retention structure 152 is coupled to the cargo platform 150 and is moveable therewith. In the embodiment illustrated in FIG. 4, the cargo retention structure 152 has a generally cruciform shape to receive and retain cargo in generally rectangular containers 154 (see FIG. 7).

The upper portion of the cargo retention structure 152 is coupled to the pressure bulkhead 144 and thus to the docking mechanism 140. When the nosecap 130 is open, the docking mechanism 140 is exposed for the docking procedure. In addition, offloading of the cargo occurs through the opening revealed by the open nosecap 130.

To assist in loading and unloading of the cargo containers 154, the cargo platform 150 and attached structures (i.e., the cargo retention structure 152, pressure bulkhead 144, and docking mechanism 140) are coupled to an elevator that extends outwardly from the cargo module 122 in a direction along a longitudinal axis of the OV 104 when activated. The elevator includes elevator jackscrews 160 disposed about the periphery of the interior portion of the cargo module 122.

Figure 5:
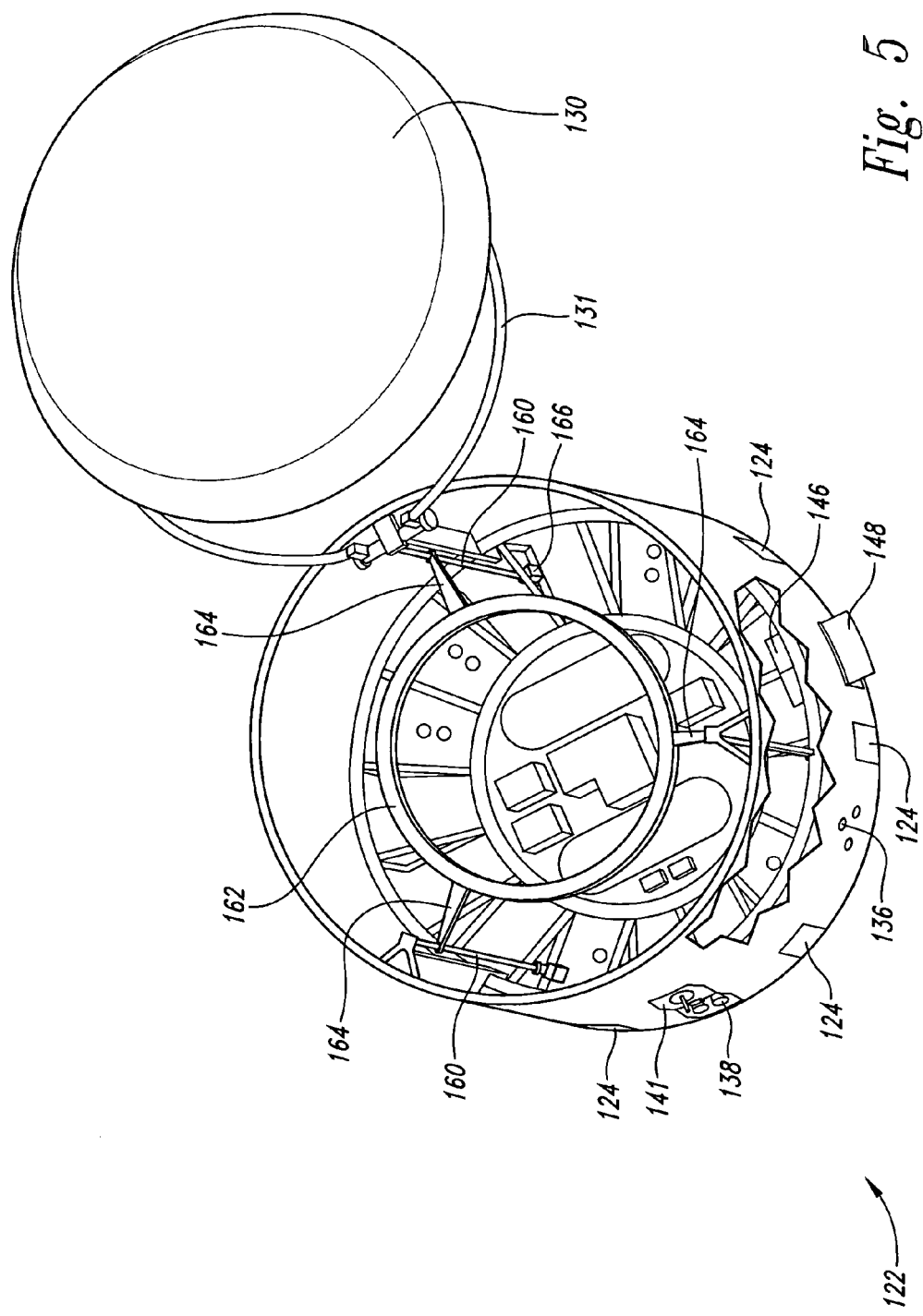
FIG. 5 is a partial cutaway perspective view of the interior of the cargo module of FIG. 4 illustrating the placement of an elevator assembly.

FIG. 5 is a perspective view of the cargo module 122. For greater clarity, the docking mechanism 140, pressure bulkhead 144, cargo platform 150, and cargo retention structure 152 have been removed. As seen in FIG. 5, the elevator jackscrews 160 are each coupled to an elevator ring 162 by a respective ring support arm 164. As will be described in greater detail below, an electric jackscrew motor 166 rotates the elevator jackscrews 160 in a desired rotational direction. As the elevator jackscrews 160 rotate, the ring support arms 164 travel along the jackscrews thus causing the elevator ring 162 to extend outward from the cargo module 122. Reversing the direction of the jackscrew motors 166 causes the ring support arms 164 and attached elevator ring 162 to move linearly in the opposite direction to a retracted or storage position.

Also illustrated in FIG. 5 is a star tracker 138 contained within the cargo module 122. Those skilled in the art will appreciate that the star tracker 138 is used to determine the precise position and orientation (i.e., attitude) of the cargo module 122. The star tracker 138 is shielded during lift-off and re-entry by the FRGF door 142. When a position determination measurement is desired, the FRGF door 142 opens and the star tracker 138 locates a plurality of stars. The star pattern formed by the located stars is used to access a database that will provide information regarding the precise location and attitude of the cargo module 122. The star tracker 138 is known in the art and need not be described in greater detail herein.

An advanced video guidance system (AVGS) proximity sensors 146 assist in the automatic guidance of the OV 104 and attached cargo module 122 to its desired destination. For example, the OV 104 and attached cargo module 122 are provided with automatic guidance to rendezvous with, by way of example, the ISS. The AVGS 146 is used in the docking process. An AVGS door 148 protects the AVGS 146 during launch and re-entry or at any other time when the AVGS is not needed.

Figure 6:
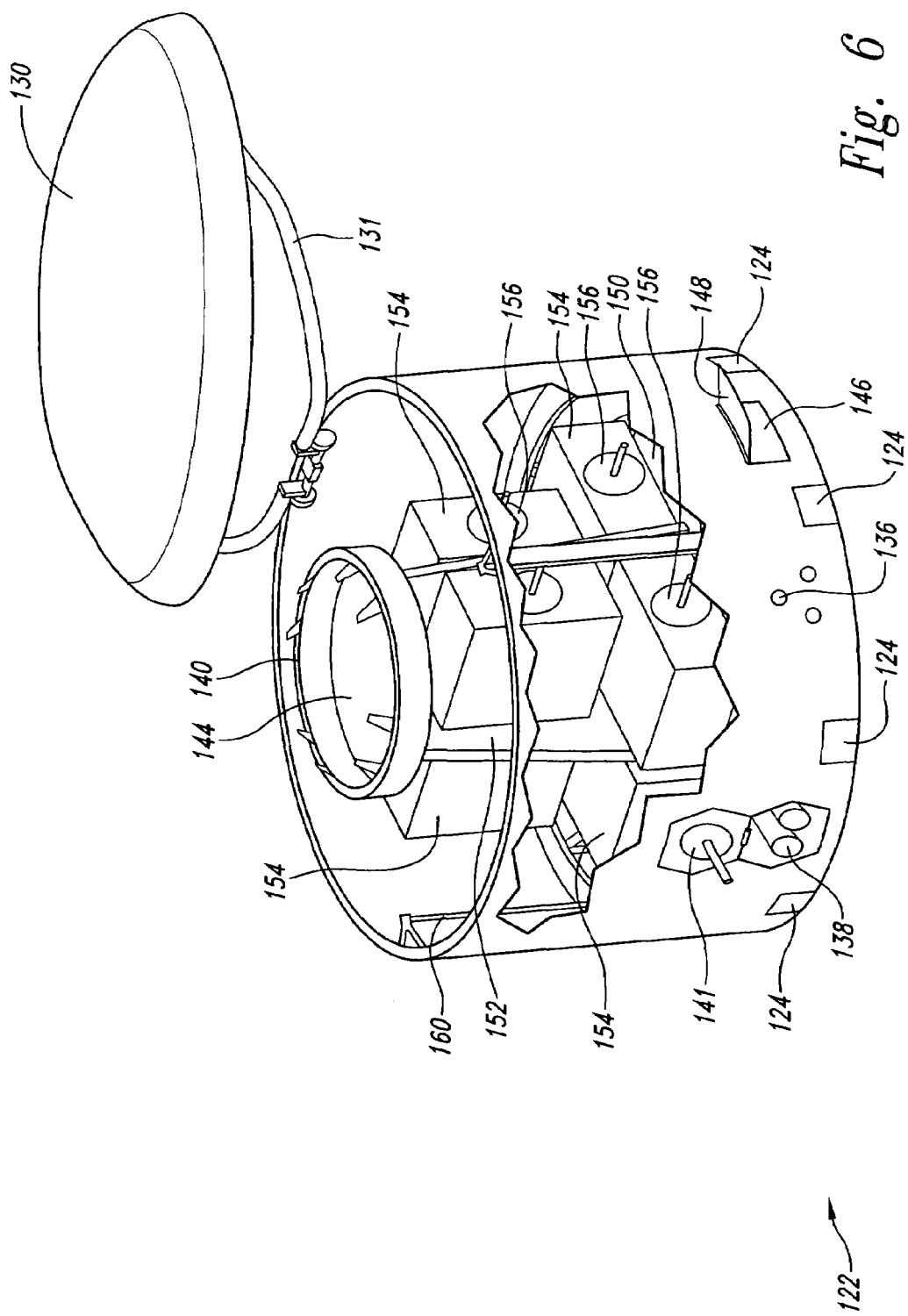
FIG. 6 is a partial cutaway perspective view of the cargo module of FIG. 4 illustrating an arrangement of cargo placed on a cargo platform.
Figure 7:
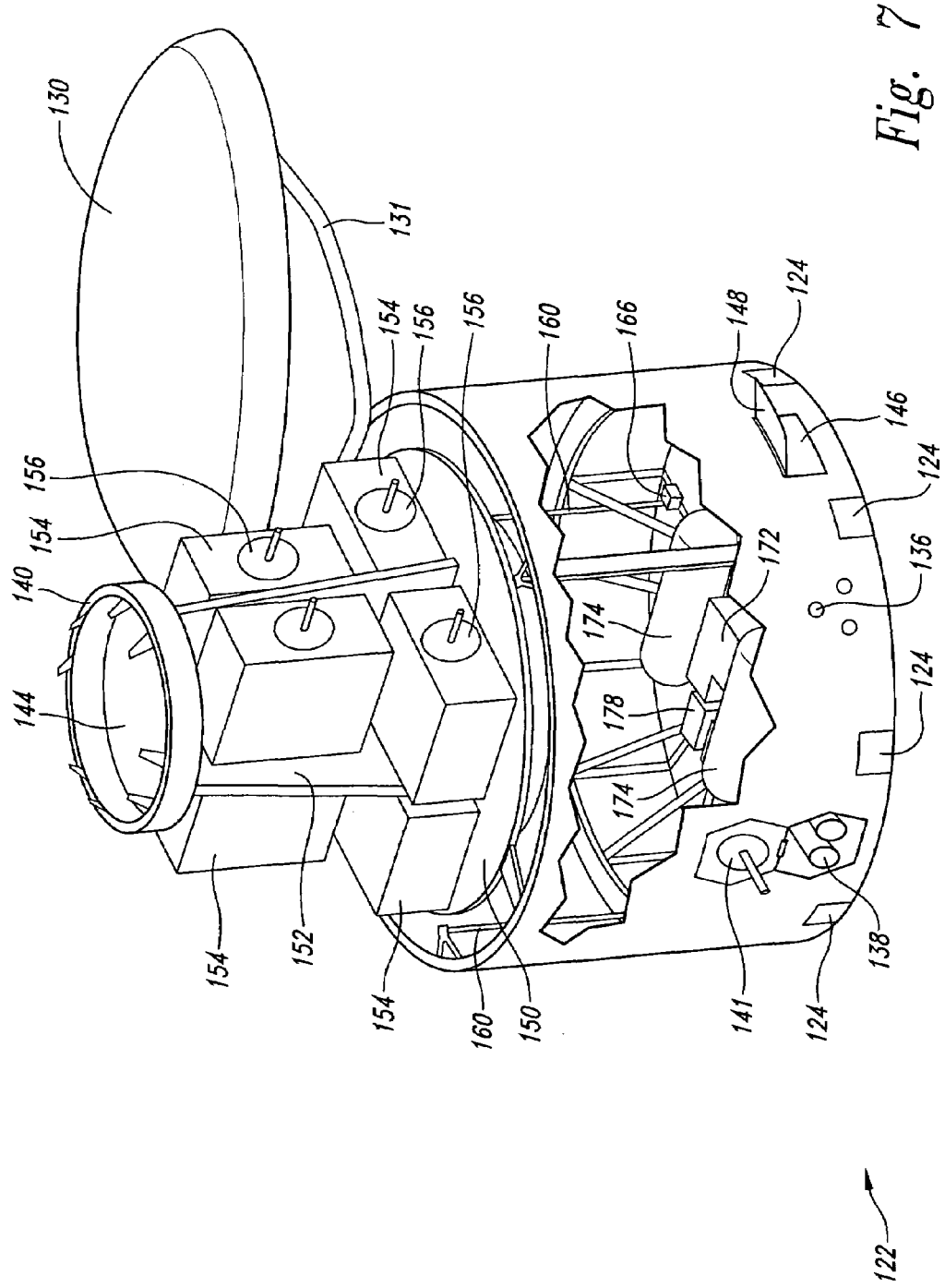
FIG. 7 is a partial cutaway perspective view of the cargo module of FIG. 6 following activation of the elevator assembly in position for docking with an orbiting object.
Figure 8:
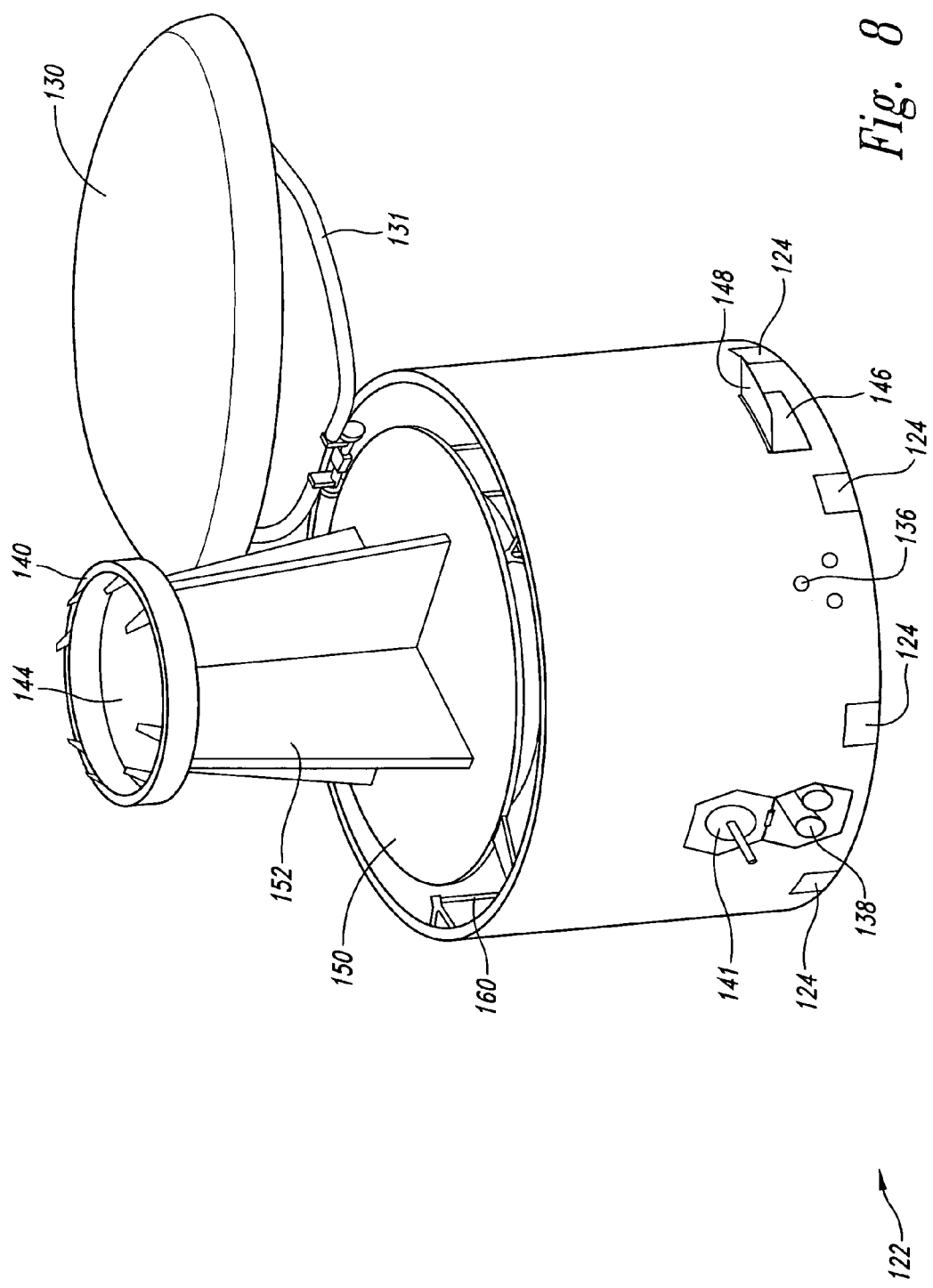
FIG. 8 is a perspective view of the cargo module of FIG. 7 following the removal of cargo.

The operation of the elevator jackscrews 160 is illustrated in FIGS. 6–8. In the cutaway view of FIG. 6, the nosecap 130 is shown in its open position. For the sake of clarity, the cargo module 122 is not docked to a space station or other orbiting platform. The cargo platform 150 is shown in its retracted or storage position in FIG. 6. The docking mechanism 140 is exposed for docking in FIG. 6. However, it is possible to extend the docking mechanism, as illustrated in FIG. 7, prior to the docking to simplify the docking maneuver.

In the cutaway view of FIG. 7, the elevator jackscrews 160 have rotated in a desired direction to extend the elevator ring 162 and attached cargo platform 150 to an extended loading/unloading position. In this position, the cargo containers 154 are readily exposed for extraction. In an exemplary embodiment, each of the cargo containers 154 includes a grapple fixture 156 for attachment by a manipulator system. For example, the ISS may be equipped with a space station remote manipulator system (SSRMS) to latch onto and remove cargo containers 154 from the retention structure 152.

It should be noted that the cargo containers 154 may be stacked in different configurations when loaded into the cargo module 122. For example, certain ones of the cargo containers 154 illustrated in FIG. 7 are essentially lying flat against the cargo platform 150 while others of the cargo containers are oriented in a transverse configuration and mounted to the panels of the retention structure 152. The configuration of the retention structure 152 allows different size cargo containers and different storage configurations to accommodate various types of cargo. Those skilled in the art will appreciate that the load experienced by the cargo containers during launch and re-entry will vary depending on the orientation of any particular cargo container. For example, the cargo container 154 lying flat against the cargo platform 150 will experience a different thrust load during the vehicle launch than the cargo container mounted to the panels of the retention structure 152. However, careful selection of a storage location based on the type of cargo contained within the cargo container 154 will assure that the thrust load during launch does not exceed design specifications for the particular cargo. Similar considerations may be taken into account when loading cargo containers in space to prepare for the forces experienced during re-entry and landing.

FIG. 8 illustrates the cargo module 122 following the removal of all cargo containers. The extended position of the cargo platform 150 shown in FIG. 8 also permits the loading of cargo containers to be returned to earth. For example, the SSRMS (not shown) may attach cargo containers to the cargo retention structure 152 for the return trip. The elevator jackscrews 160 then rotate in the opposite rotational direction to retract the cargo platform 150 (and attached cargo containers 154, if any) to a retracted position. Following disengagement of the docking mechanism 140, the nosecap 130 may be returned to its closed position for the re-entry phase of the space mission. Thus, the embodiment illustrated in FIGS. 4–8 allow easy access for installation and removal of cargo containers 154.

Figure 9:
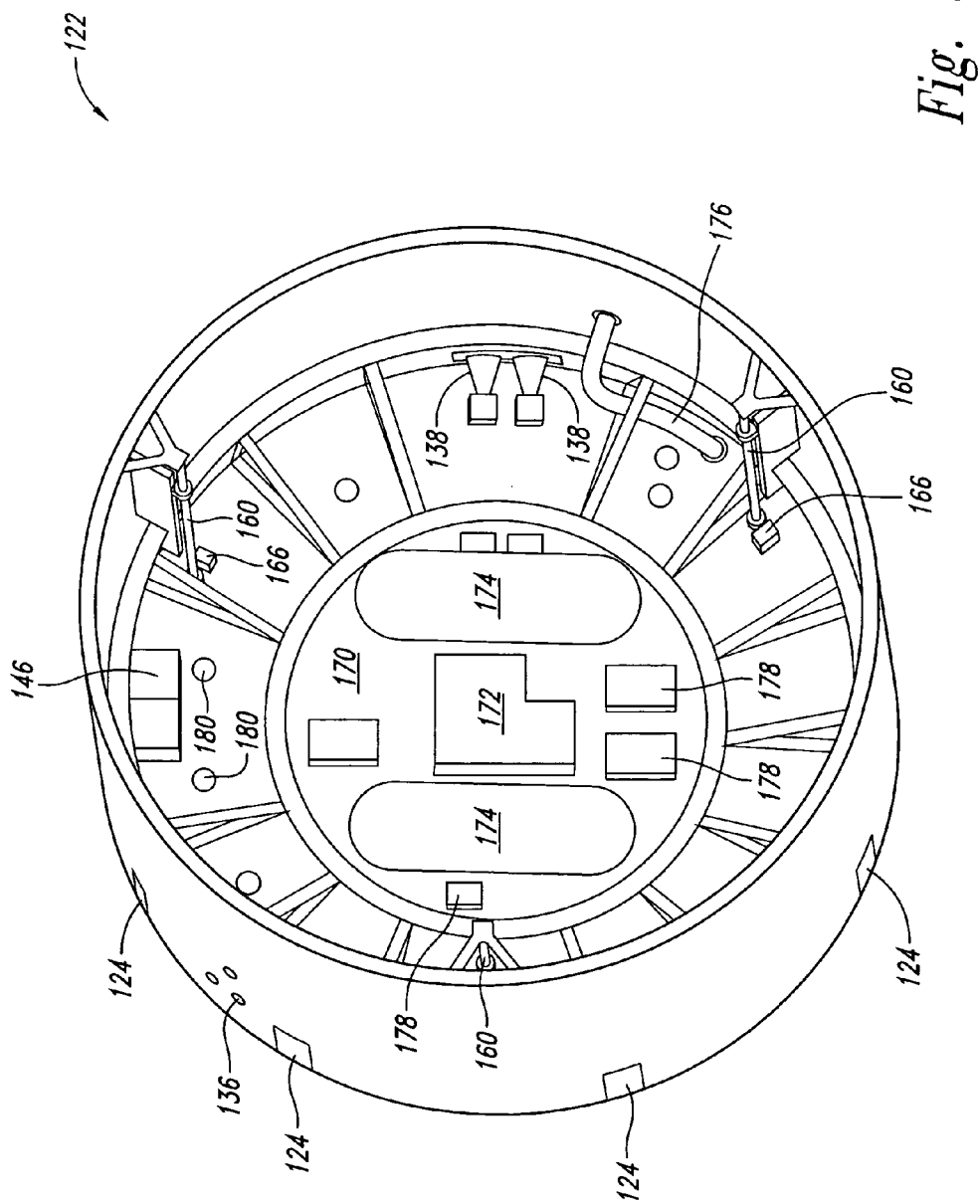
FIG. 9 is perspective view of an interior equipment compartment of the cargo module of FIG. 4.

FIG. 9 illustrates the interior portion of the cargo module 122. For the sake of clarity, the components, such as the nosecap 130, docking mechanism 140, cargo platform 150 and associated components have been removed. As previously discussed, the elevator jackscrews 160 are coupled to jackscrew motors 166 and rotate in the desired direction as the jackscrew motors rotate. The central part of FIG. 9 illustrates an equipment pallet 170. The equipment pallet 170 contains an ACS controller 172 to control operation of the thrusters 136. Gas storage containers 174 contain gaseous nitrogen used with the thrusters 136. The ACS controller 172 contains the necessary regulators and valves to control flow from the gas storage containers 174 to the thrusters 136.

FIG. 9 also illustrates a cargo thermal control system 176. Prior to launch, the cargo thermal control system 176 is connected to an external umbilical (not shown) through which conditioned gas is piped. The conditioned gas may be air, nitrogen, or other well known mixtures. The conditioned gas is pumped through the cargo thermal control system 176 to cool the interior of the cargo module 122.

In one implementation, the cargo module 122 may contain gas or chemical canisters (not shown) to generate electricity in a well-known manner. In the implementation illustrated in FIG. 9, a plurality of lithium batteries 178 provide power to the equipment pallet 170.

FIG. 9 also illustrates a series of pressure equalization vents 180. As previously discussed, the cargo module 122 illustrated in FIGS. 4–9 is an unpressurized cargo module. The pressure equalization vents 180 equalize pressure between the cargo module 122 and the OV 104. In turn, the OV 104 includes a vent door (not shown) that is selectively movable between an open position and a closed position. The vent door may be closed while the OV 104 and cargo module 122 are in space because pressure has already been equalized. However, the OV vent door is moved to the open position during launch and re-entry to equalize pressure between the interior portions of the cargo module 122 and the environment.

Figure 10:
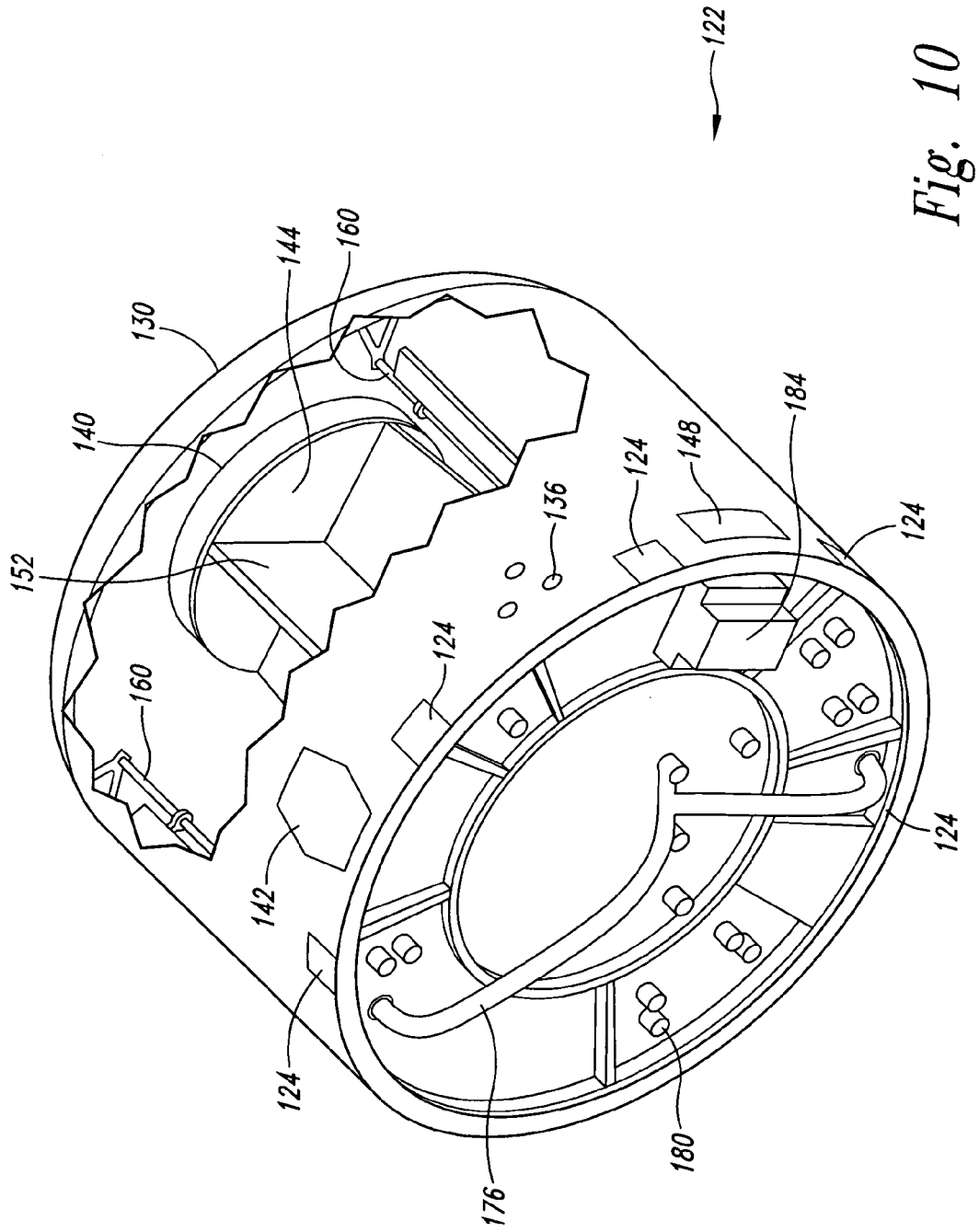
FIG. 10 is rear perspective view of the cargo module of FIG. 4.

FIG. 10 is a rear perspective view of the cargo module and illustrates a cargo module controller 184. The cargo module controller 184 may interface with the main computer (not shown) in the OV forward-body portion 132a. The main computer provides control signals for flight operations. For example, the main computer in the OV 104 may generate a command to open the nosecap 130. The cargo module controller 184 responds to commands from the main computer and generates the necessary control signals to open the nosecap 130. Similarly, the cargo module controller 184 generates signals to control the operation of the jackscrew motors 166.

Figure 11:
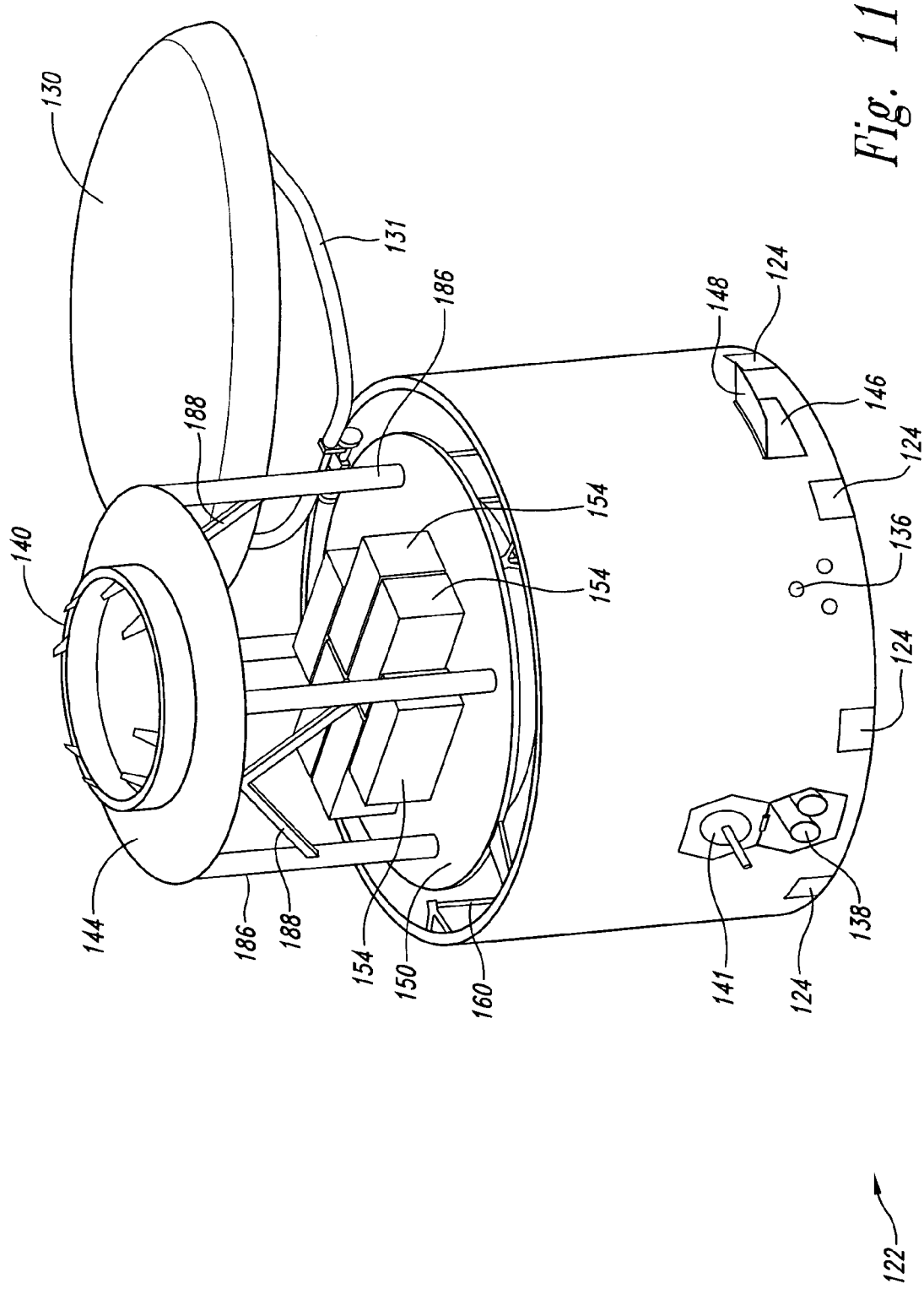
FIG. 11 is a perspective view of an alternative cargo container retention structure.

FIG. 11 illustrates an alternative cargo retention structure to replace the cargo retention structure 152 of FIG. 4. In the embodiment illustrated in FIG. 11, a series of support beams 186 are coupled between the cargo platform 150 and the pressure bulkhead 144. Cross braces 188 between the support beams 186 and the pressure bulkhead 144 provide additional strength. In this embodiment, the central cargo retention structure 152 (see FIG. 4) has been replaced. This embodiment allows a greater volume for loading of cargo containers 154. However, loading and unloading of the cargo containers 154 may be somewhat more difficult because of the placement of the support beams 186 and the cross braces 188.

Figure 12:
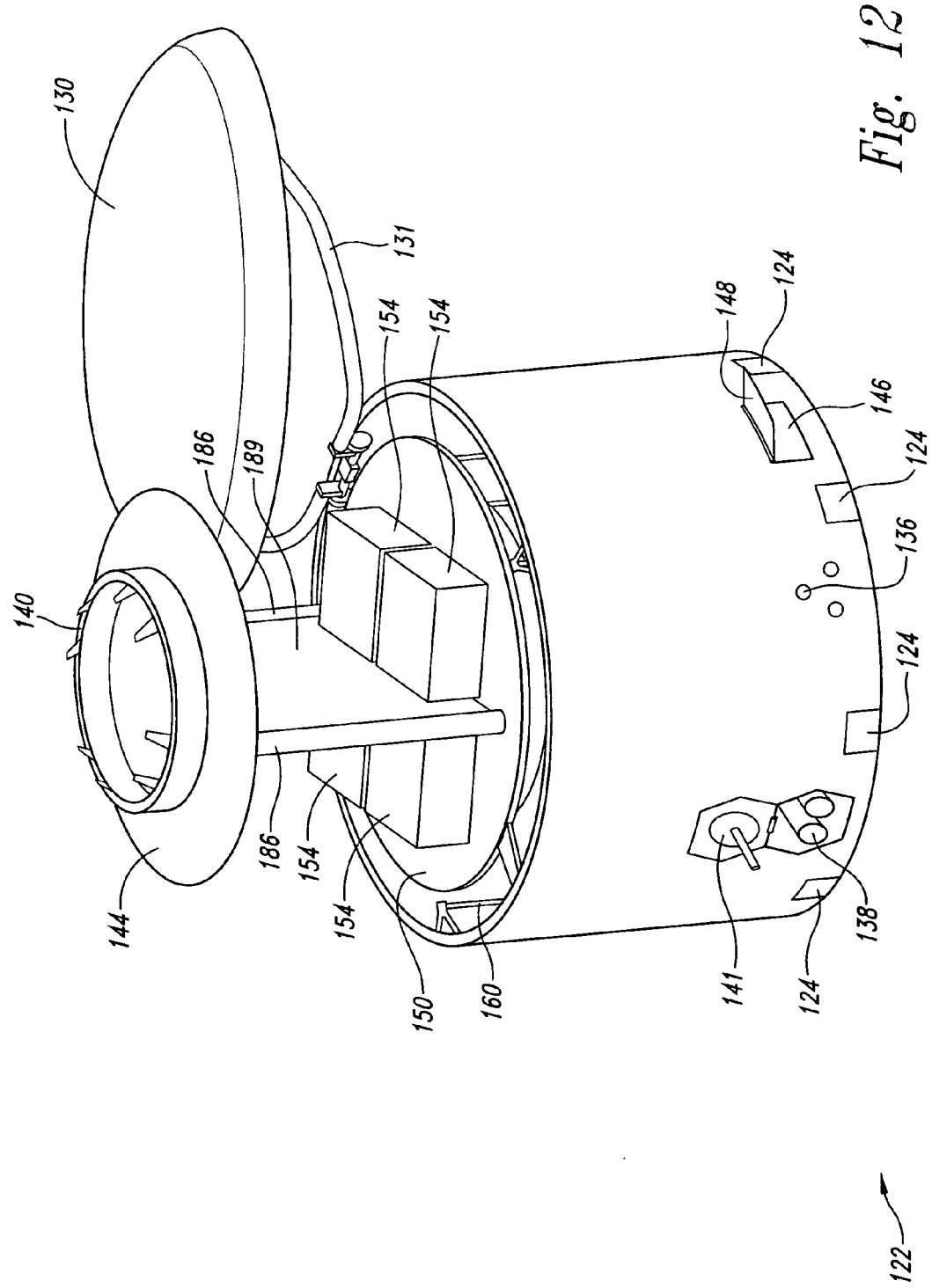
FIG. 12 is a perspective view of yet another alternative cargo retention structure.

In yet another alternative embodiment, FIG. 12 illustrates a cargo retention structure having support beams 186 and an interconnecting cargo retention wall 189. Additional cross bracing (not shown) may also couple the support beams 186 and/or the cargo retention wall 189 to the pressure bulkhead 144. This embodiment may permit greater volume for the cargo containers 154 than the embodiment of FIG. 8, yet permit greater access to the containers for loading/unloading than the embodiment FIG. 11. Those skilled in the art will appreciate that other variations of cargo retention structures are also possible.

Figure 13:
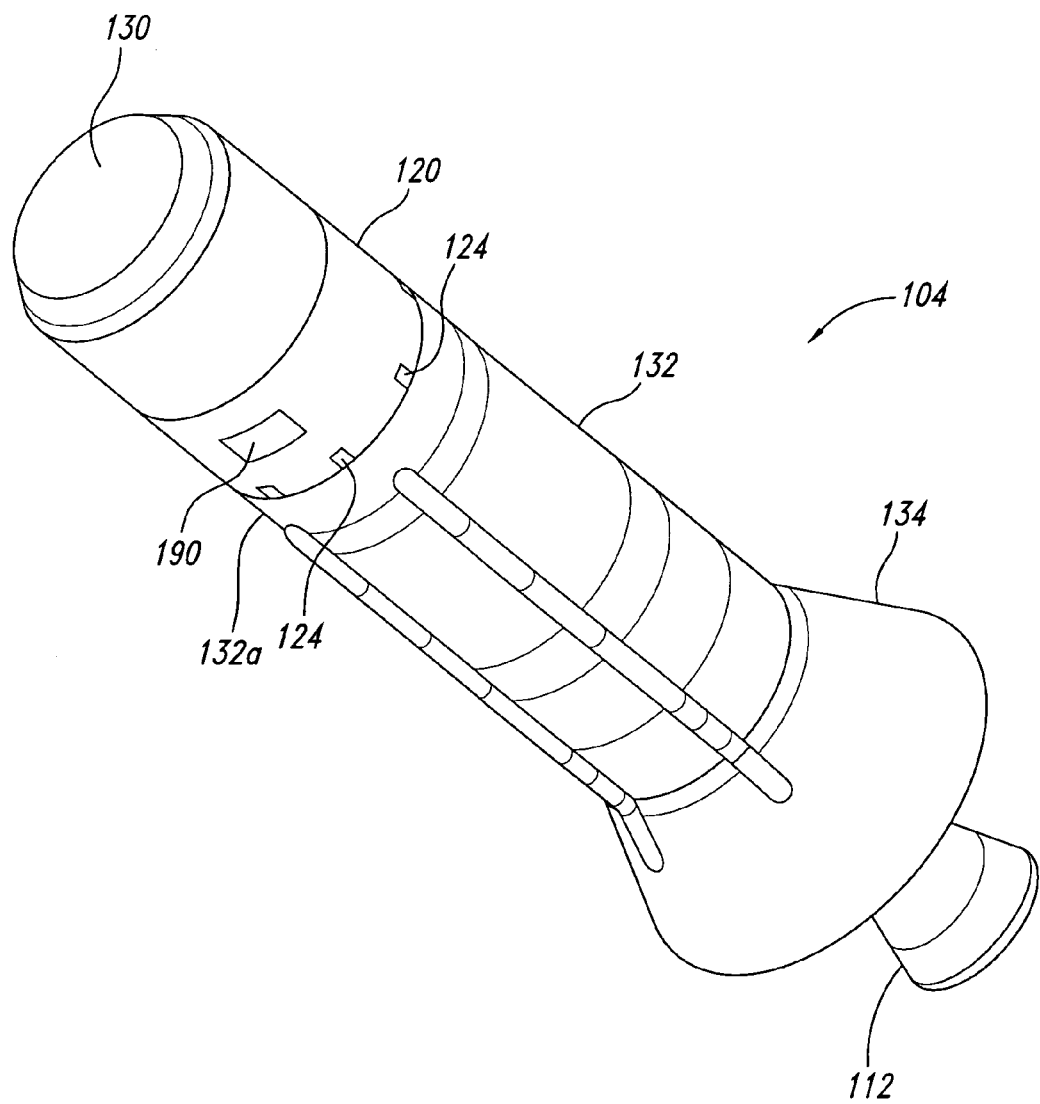
FIG. 13 is a perspective view of an orbital vehicle with an alternative module.

The space launch vehicle 100 (see FIG. 1) is designed for reusable operation. In addition, the modules 120 are designed to be interchangeable atop the OV 104. The cargo module 122 illustrated in FIGS. 4–10 provide details of one possible embodiment of the cargo module. FIGS. 11–12 illustrate alternative interior arrangements of the cargo module 122. FIG. 13 illustrates an alternative embodiment of the cargo module 122. In the embodiment of FIG. 13, the cargo module 122 is cylindrical in shape and has a diameter approximately equal to the diameter of the OV 104. However, the length of the cargo module 122 in FIG. 13 has been significantly increased. This can accommodate additional cargo. The nosecap 130 operates in the manner described above. In addition to offloading cargo through the end of the cargo module 122 covered by the nosecap 130, a hatchway 190 may be provided in the sidewall of the cargo module. Those skilled in the art will appreciate that the size and location of the hatchway 190 may vary from that illustrated in FIG. 13 with no adverse effects on operation of the space launch vehicle 100.

Figure 14:
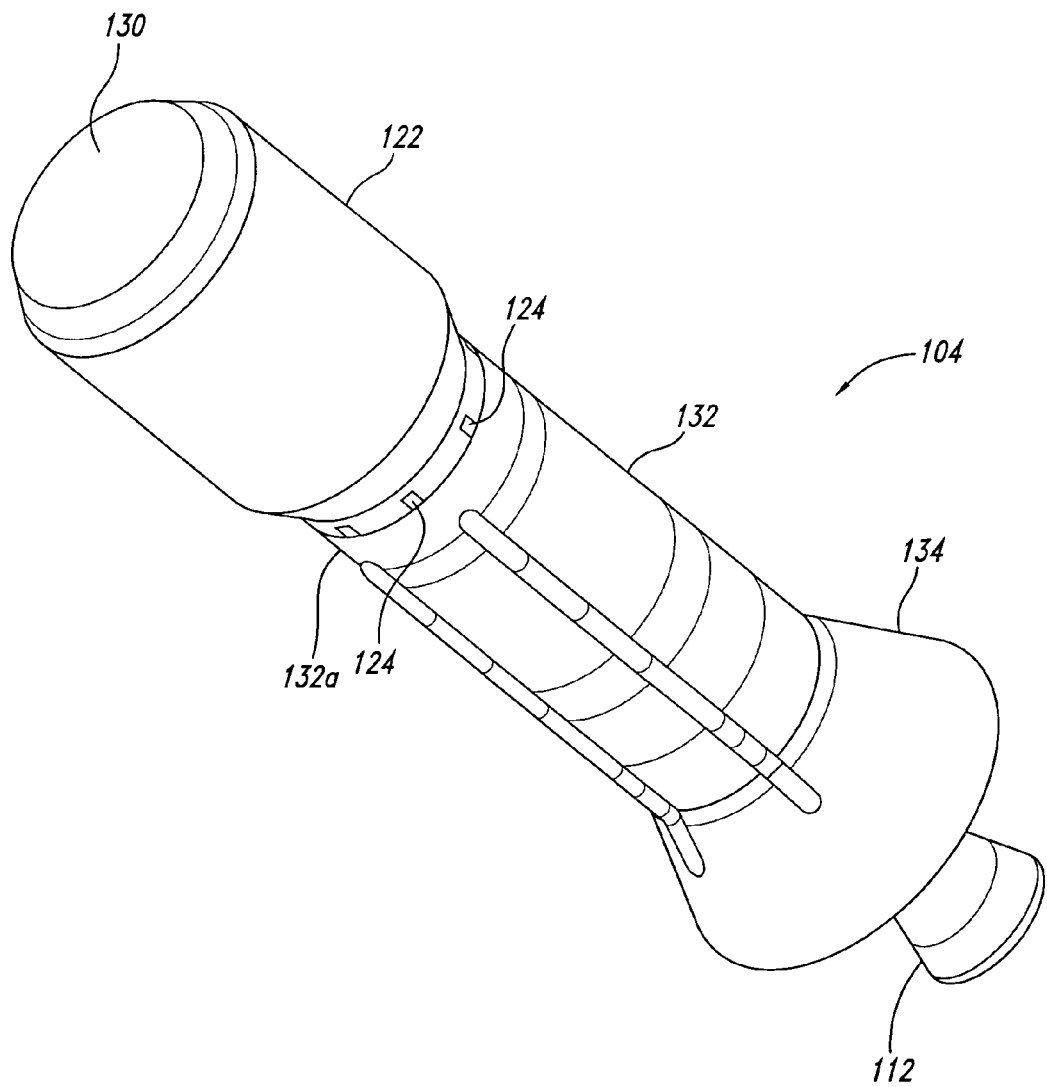
FIG. 14 is a perspective view of an orbital vehicle with yet another alternative module.

FIG. 14 illustrates another alternative embodiment of the cargo module 122 wherein the length and the diameter of the cargo module are both increased. In an exemplary embodiment, the dimensions of the cargo module 122 in the vicinity of the orbital vehicle interface 124 are standardized to mate with the OV 104. Alternatively, an intermediate adapter ring (not shown) can be used to accommodate the transition between the diameter of the OV 104 and the cargo module 122. The larger diameter and length of the cargo module 122 in FIG. 14 accommodates larger payloads.

Figure 15:
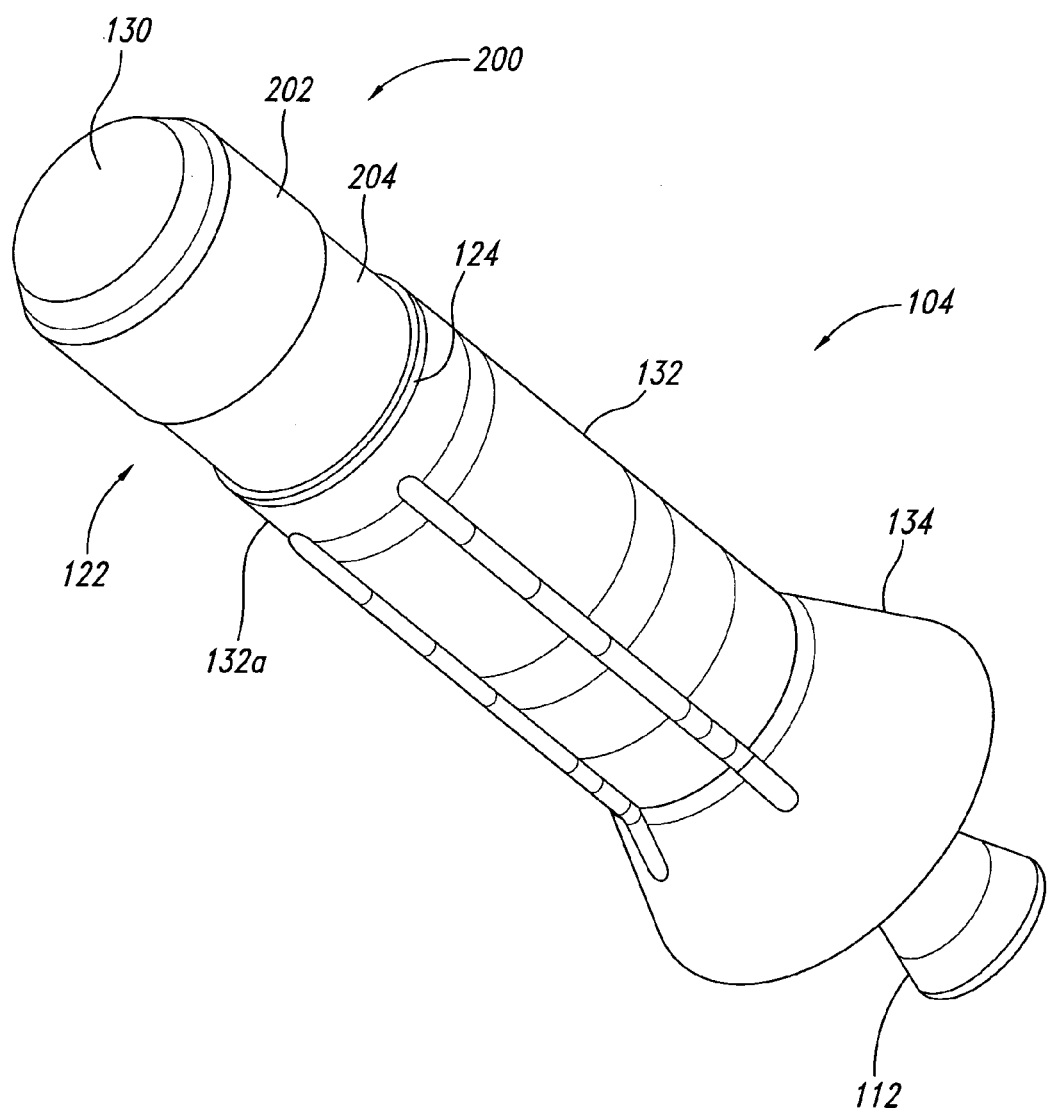
FIG. 15 is a perspective view of an orbital vehicle with another alternative payload module having an extended fairing.

FIG. 15 illustrates yet another alternative embodiment of the cargo module 122. In the embodiment of FIG. 15, the sidewalls of the cargo module 122 form a fairing 200 comprising a forward fairing 202 and an aft fairing 204. The diameter of the aft fairing 204 is less than the diameter of the forward fairing 202 so that the forward fairing can move over the aft fairing in a telescoping manner to a retracted position. The operation of the fairing 200 is illustrated in U.S. Pat. No. 6,059,234 which is assigned to the assignee of the present disclosure. U.S. Pat. No. 6,059,234 is incorporated herein by reference in its entirety.

In one example of a typical operation, the forward fairing 202 is extended to its maximal length to accommodate a large amount of cargo. Once in orbit, and docked to the desired target (e.g., a space station), the cargo may be unloaded in a manner described above. Following the unloading of the cargo, and possible loading of return cargo, the cargo module 122 is disengaged and the nosecap 130 closed. Under circumstances where a small amount of cargo is returned to earth, the forward fairing 202 may be adjusted to slide over the aft fairing 204 to the retracted position for the re-entry. Alternatively, the forward fairing 202 may remain in the extended position to accommodate the return of larger amounts of cargo to earth.

Figure 16:
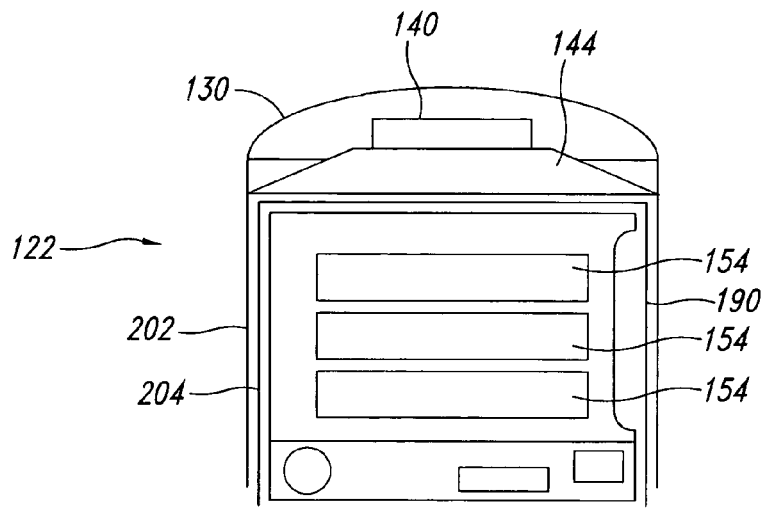
FIG. 16 is a side cutaway view of the cargo module of FIG. 15 with the extended fairing in a retracted position.
Figure 17:
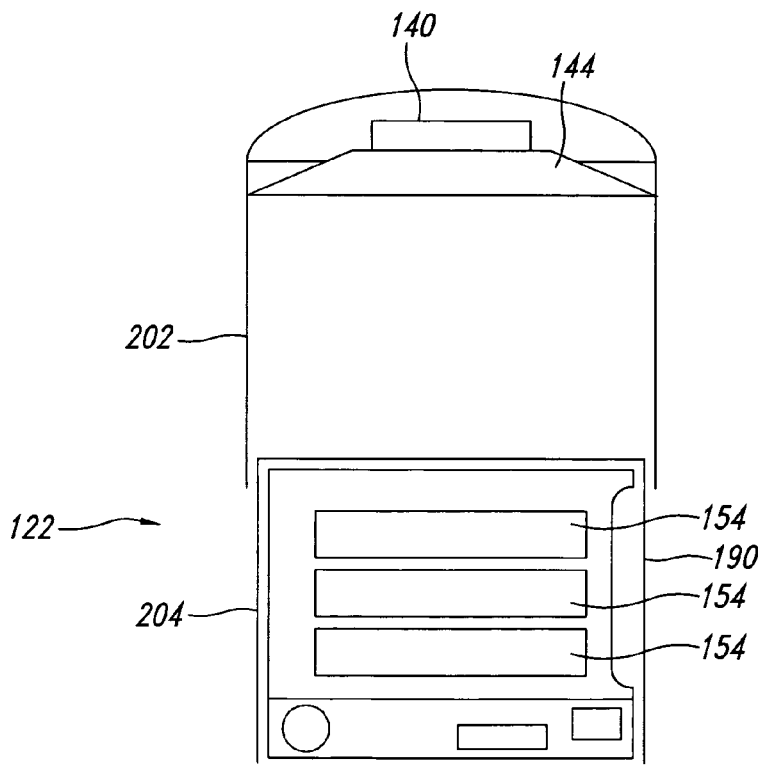
FIG. 17 is a side cutaway view of the cargo module of FIG. 16 with the fairing in an extended position.

Those skilled in the art will appreciate that the slideable forward fairing 202 may be adjusted to the retracted position during launch and extended for the return as well. This embodiment is illustrated in FIGS. 16–17. In FIG. 16, the cargo module 122 is illustrated with the forward fairing 202 in the retracted position. In space, the nosecap 130 is opened to expose the docking mechanism 140. Cargo may be offloaded through the opening near the nosecap 130, as described above. Alternatively, the forward fairing 202 may be moved to its extended position to thereby expose the hatchway 190. In this embodiment, cargo may be offloaded via the hatchway 190. In yet another alternative embodiment, the hatchway 190 may be simply an aperture that is exposed when the forward fairing 202 is moved to its extended position. When the forward fairing 202 is adjusted to the retracted position, the forward fairing also serves to seal the opening in the aft-fairing. This embodiment eliminates the extra weight associated with the hatchway 190.

Figure 18:
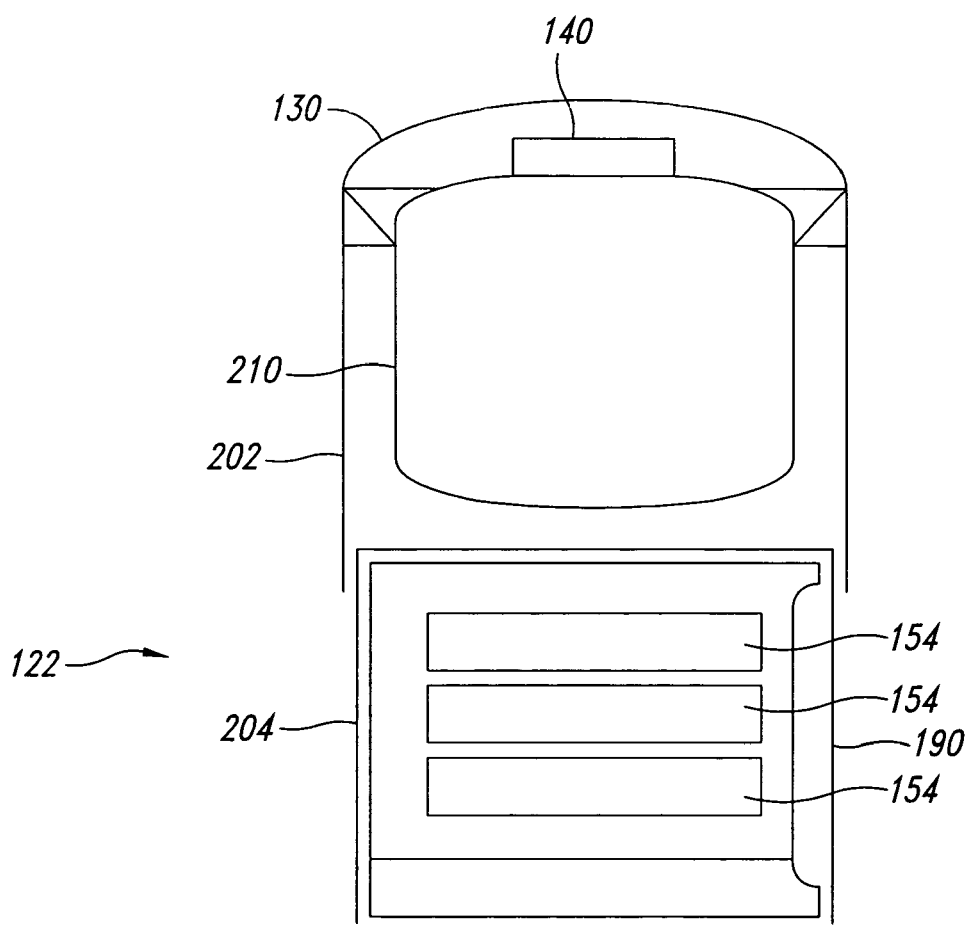
FIG. 18 is a side cutaway view of the cargo module of FIG. 15 with the fairing in an extended position for greater cargo capacity.
Figure 19:
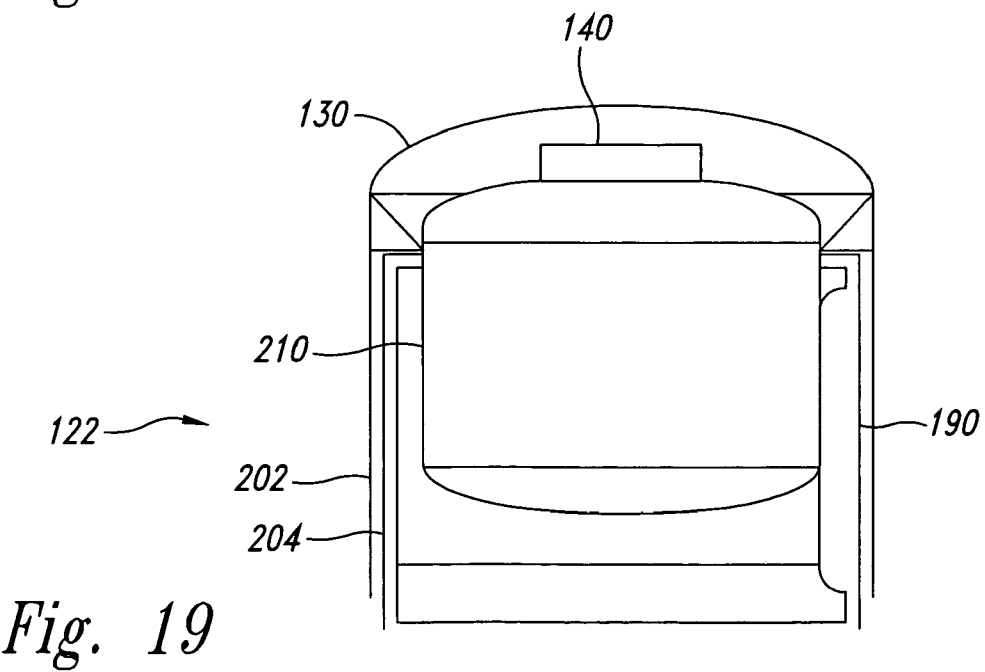
FIG. 19 is a side cutaway view of the cargo module of FIG. 18 with the fairing in a retracted position.

In yet another embodiment, illustrated in the cutaway views of FIGS. 18–19, the cargo module 122 of FIG. 15 may be utilized to carry pressurized cargo, unpressurized cargo, or a combination of pressurized and unpressurized cargo. FIG. 18 illustrates a combination of pressurized cargo and unpressurized cargo. In this embodiment, the docking mechanism 140 is attached directly to a pressurized cargo container 210.

As discussed previously, the nosecap 130 can be moved to the closed position to protect the docking mechanism 140 during launch and re-entry. In orbit, the nosecap 130 is opened to expose the docking mechanism 140. As those skilled in the art will appreciate, the docking mechanism 140 for the pressurized cargo container 210 serves to permit the transfer of cargo through a sealed hatchway formed by the docking mechanism 140. Thus, cargo contained within the pressurized cargo container 210 is never exposed to the environment of space.

Those skilled in the art will also appreciate that the docking mechanism 140 on the pressurized cargo container 210 may serve to transfer electrical power, liquids, such as water, LOX, rocket fuel, or the like to and from the pressurized cargo container 210.

In yet another alternative embodiment, the pressurized cargo container 210 may be completely extracted from the cargo module 122 and allowed to remain in orbit. In the embodiment illustrated in FIGS. 1–10, the outer wall of the cargo module 120 also serves to define the interior compartment of the cargo module. In contrast, the pressurized cargo container 210 illustrated in FIG. 18 has side walls independent of the walls of the cargo module 122. In the embodiment illustrated in FIG. 18, the diameter of the cargo module 122 is approximately 13.8 feet. The diameter of the pressurized cargo container 210 is approximately 11 feet. Thus, the pressurized cargo container 210 can be configured as a totally independent structure that can be removed from the cargo module 122. For example, the pressurized cargo container 210 may carry oxygen to a space station. The complete extraction of the pressurized cargo container 210 allows it to remain docked to the space station via the docking mechanism 140 to thereby serve as a reserve source of oxygen. Similar applications may be performed with other goods, such as water.

FIG. 19 illustrates the use of the cargo module 122 with the forward fairing 202 in the retracted position. In the example illustrated in FIG. 19, the cargo module 122 contains a single pressurized cargo container 210. This embodiment may be used, by way of example, to return the pressurized cargo container 210 to earth. In one example application of the cargo module 122, FIG. 18 may illustrate an example of a launch configuration where the forward fairing 202 is extended to accommodate a large cargo load. Following delivery of cargo to the orbital destination (e.g., a space station), the forward fairing may be adjusted to its retracted position, as illustrated in FIG. 19, for re-entry. Alternatively, the forward fairing 202 may be left in its extended position, as illustrated in FIG. 18, if the cargo module 122 is carrying return cargo to earth. Various combinations of the cargo module 122 with the forward fairing 202 in the extended position or the retracted position may be readily understood by those skilled in the art.

Figure 20:
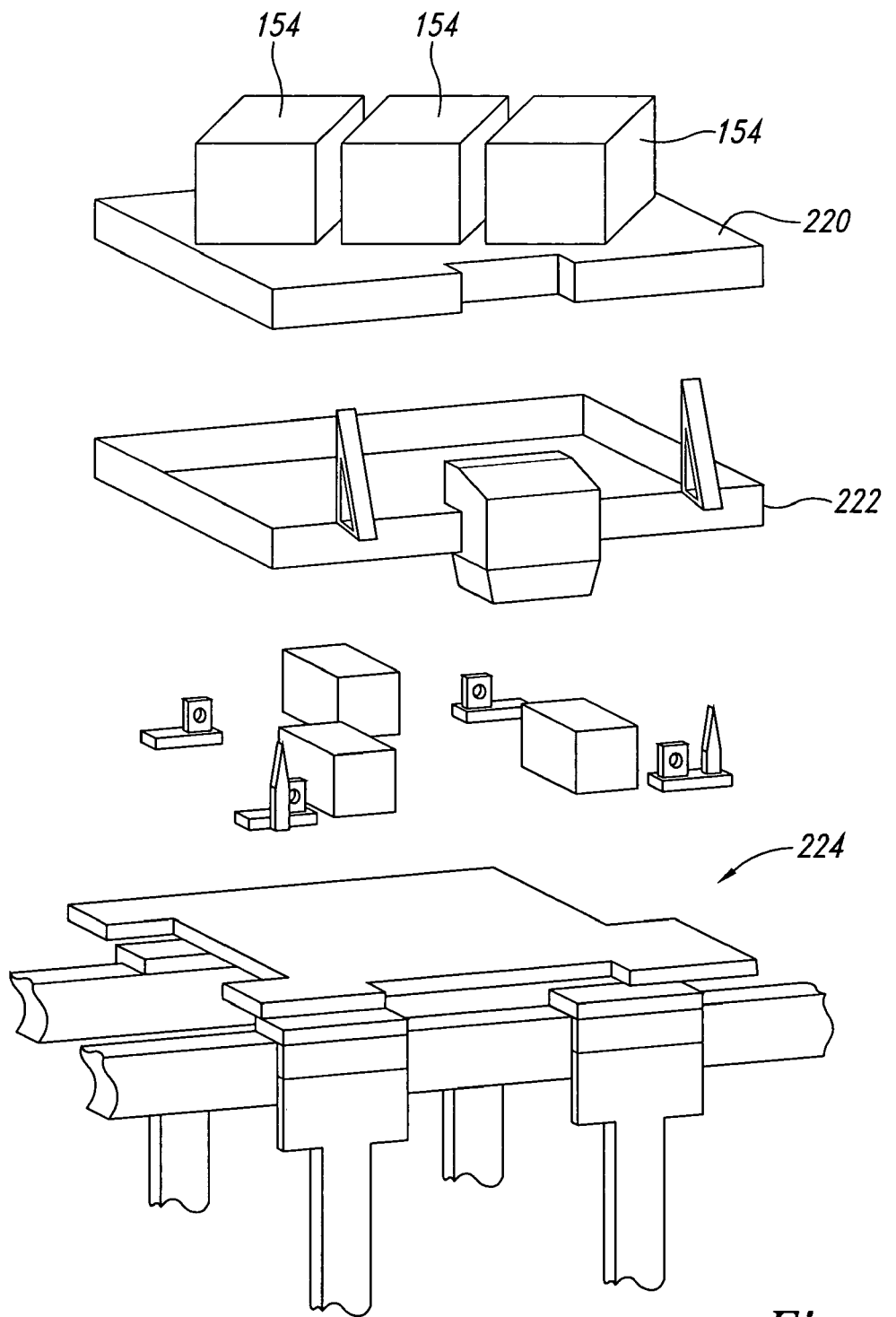
FIG. 20 is a perspective view of a pallet containing multiple cargo containers for storage at a predetermined exterior location.

FIGS. 6–12 illustrate the cargo as a series of cargo containers 154 that may be off-loaded individually. In an alternative embodiment, multiple ones of the cargo container 154, sometimes referred to as an orbital replacement unit (ORU), may be used to provide replacement components, such as batteries, gyroscopes, transponders, regenerative heat exchangers, pumps, and the like. The ORUs may be stored outside the space station until needed. To accommodate such storage, the ORU 154 may be stacked on a flight releasable attachment mechanism (FRAM) adapter plate 220, as shown in FIG. 20. The FRAM adapter plate 220 is configured to clamp to an active FRAM 222, which in turn is coupled to a payload carrier plate 224 on a space station. For example, the ISS includes a payload attachment system site on a predetermined truss (not shown). The ORU 154 is mounted on the adapter plate 220 and the combination coupled to the active FRAM 222. The combination of ORU 154, adapter plate 220, and active FRAM 222 is stored within the interior portion of the cargo module 122 for delivery into space. The retention structure 152 (see FIG. 4) can be configured with standardized mounting features for attachment and detachment of the ORUs 154 when coupled to the adapter plate 220 and active FRAM 222.

As discussed above with respect to FIG. 7, the cargo containers 154 may be mounted in different configurations within the cargo module 122. Similarly, the combination of an ORU 154, adapter plate 220, and active FRAM 222 may be stored within the cargo module in different configurations. For example, one combination (i.e., an ORU 154, adapter plate 220, and active FRAM 222) may be stored flat against the cargo platform 150 (see FIG. 7) while another combination unit may be stored in a transverse configuration and mounted against the panels of the retention structure 152. Those skilled in the art will appreciate that the ORUs in these different configurations will undergo different forces during launch and re-entry. Careful selection of a storage location will assure that the cargo within the ORUs 154 will not be subjected to forces exceeding the design specifications for that particular cargo.

If a particular ORU 154 requires electrical power or other signals, those signals may be provided by an interface (not shown) within the cargo module. For example, electrical power may be provided to a particular ORU 154 via the active FRAM 222 and adapter plate 220. As will be described in greater detail below, the active FRAM 222 is standardized and has standardized electrical connections. The retention structure 152 (see FIG. 7) may be provided with the appropriate electrical connectors to mate with the active FRAM as well as the necessary mechanical connections to receive and retain the active FRAM (and the ORU 154 and adapter plate 220 mounted thereto).

The active FRAM 222 can provide an interface for electrical power, environmental control (e.g., heating and/or cooling) and data to the ORU 154. Those skilled in the art will appreciate that each ORU 154 may have unique requirements. For example, one type of ORU 154 may require electrical power and maintain data while another type of ORU may only require heating. Accordingly, the adapter plate 220 includes an interface that may be unique or customizable for each type of ORU 154. However, the mechanical attachment interface of the adapter plate 220 to the active FRAM 222 is standardized. Furthermore, the active FRAM 222 has standard mechanical and electrical interface configurations to accommodate mounting to the payload carrier plate 224. In this manner, cargo can be delivered to a space station and stored in a location on the exterior of the space station structure until needed.

In an exemplary embodiment, the space station provides electrical power, environmental control, and data at the location of the payload carrier plate 224. When coupled to the payload carrier plate 224, the active FRAM 222 provides the necessary interfaces through which the necessary signals may be coupled to the ORU 154. For example, one type of ORU 154 may require only electrical power. The adapter plate 220 may include electrical connections only for the necessary power supply connections. The necessary electrical power is coupled to the ORU 154 via the payload carrier plate 224, the standardized active FRAM 222, and the customized adapter plate 220. In another example, a particular type of ORU 154 may require heating as well as electrical power. In this example, additional electrical connectors may be provided by the customized adapter plate 220 to connect to the required connectors on the standardized active FRAM 222 and the standardized payload carrier plate 224.

Thus, the plurality of cargo modules 122 have standardized fittings to mate with the OV 104, but otherwise provide great flexibility with various internal and external configurations to accommodate specific mission goals. In operation, one of the plurality of different cargo modules 122 is selected based on mission parameters and mounted atop the OV. The cargo module 122 may be loaded with cargo prior to attachment to the OV 104 or after attachment to the OV. The reusable space launch vehicle 100 (see FIG. 1) is launched and the OV 104 and attached cargo module 122 placed into orbit, as described above. Following delivery of cargo, the OV 104 and attached cargo module 122 return to earth. In a typical mission plan, the OV 104 and attached cargo module 122 return to the launch site. The LAP 102 and OV 104 may be prepared for a new mission. A different one of the plurality of cargo modules 122 may be selected for mounting atop the OV in a manner described above. Thus, the interchangeability of cargo modules 122 provide greatly reduced cost per mission, flexibility to achieve various mission goals, and reduced turnaround time from one mission to the next.

The foregoing described embodiments depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Accordingly, the invention is not limited except as by the appended claims.

The invention claimed is:

1. A reusable cargo module system, comprising:
   a reusable orbital vehicle (OV) having a first end and a second end;
   a propulsion system mounted to the OV proximate the second end;
   a reusable unpressurized cargo module having a sidewall, an attachment end of the sidewall configured to be coupled to the OV first end and a free-end portion of the sidewall opposite the attachment end, the cargo module having an interior portion defined by a region within the sidewall and intermediate the attachment end and the free-end portion;

a retention structure configured to retain cargo, the retention structure having first and second ends, the retention structure first end being coupled only to a movable support platform within the interior portion of the cargo module and independent of the cargo module sidewall; and a docking mechanism affixed to the retention structure second end to permit docking of the cargo module with an orbiting object.

2. The system of claim 1, further comprising a guidance system to control movement of the OV and attached cargo module.

3. The system of claim 1, further comprising a moveable nosecap coupled to the cargo module free-end portion and being moveable between a closed position for launch and re-entry and an open position while in orbit, the docking mechanism being positioned intermediate the OV first end and the nosecap when the nosecap is in the closed position, the docking mechanism being exposed to an environment of space when the nosecap is in the open position.

4. The system of claim 1, further comprising a moveable nosecap coupled to the free-end portion, the nosecap being moveable between a closed position and an open position.

5. The system of claim 4 wherein the support platform is configured to receive and retain the cargo, the system further comprising a displacement mechanism coupled to the cargo module and the support platform, the displacement mechanism being operable to displace the support platform in a direction away from the cargo module attachment end to thereby expose the cargo for removal through the cargo module free-end portion when the nosecap is in the open position.

6. The system of claim 5 wherein the displacement mechanism comprises:
a motor with a rotatable shaft coupled to the cargo module;
a screw jack coupled to the motor shaft for rotation therewith; and
a connecting structure coupled to the support platform and the screw jack wherein the connecting structure is displaced along a longitudinal axis of the screw jack as the motor shaft rotates.

7. The system of claim 6 wherein the rotatable shaft rotates in a first rotational direction to displace the connecting structure in a first direction and rotates in a second rotational direction opposite the first rotational direction to displace the connecting structure in a second direction opposite the first direction.

8. The system of claim 1, further comprising a hatchway in the sidewall of the cargo module to permit access to the interior portion and sized to permit placement and removal of cargo.

9. The system of claim 1, further comprising:
a hatchway in the sidewall; and
a covering sidewall moveable between first and second positions, the covering sidewall overlying the cargo module sidewall to thereby seal the hatchway when in the first position, the covering sidewall exposing the hatchway to permit access to the interior portion when in the second position.

10. The system of claim 9, further comprising a moveable nosecap coupled to the covering sidewall, the nosecap being moveable between a closed position and an open position.

11. The system of claim 10, further comprising the docking mechanism coupled to the cargo module to permit docking of the cargo module to an orbiting object, the docking mechanism being positioned intermediate the OV first end and the nosecap when the nosecap is in the closed position, the docking mechanism being exposed to an environment of space when the nosecap is in the open position.

12. The system of claim 9 wherein the cargo retention structure is positioned within the interior portion proximate the cargo module sidewall, the system further comprising an additional cargo retention structure positioned within an interior portion defined by the covering sidewall when in the second position.

13. The system of claim 12, further comprising an unpressurized cargo container coupled to the additional cargo retention structure.

14. The system of claim 13, further comprising a moveable nosecap coupled to the covering sidewall, the nosecap being moveable between a closed position and an open position.

15. The system of claim 14, further comprising a terminal aperture configured for exposure when the nosecap is in the open position to thereby permit unloading of the unpressurized cargo container through the terminal aperture in the cargo module.

16. The system of claim 1 wherein the retention structure further comprises: a bulkhead member; and
first and second panels extending between the support platform and the bulkhead member, the first and second panels being configured substantially orthogonal to each other.

17. The system of claim 1 for use with first and second cargo containers, each of the first and second cargo containers having opposing rectangular side panels wherein the retention structure is configured to receive and retain the first cargo container with the opposing rectangular side panels being retained in a first orientation, the retention structure being further configured to receive and retain the second cargo container with the opposing rectangular side panels being retained in a second orientation different from the in first orientation.

18. The system of claim 17 wherein the first orientation is substantially orthogonal to the second orientation.

19. The system of claim 1, further comprising:
an adapter plate configured to receive and retain a cargo container; and
an interface structure coupleable to the adapter plate, the interface structure including an interface configured to connect to the retention structure.

20. The system of claim 19 wherein the interface provides electrical power to the cargo container.

21. The system of claim 19 for use with first and second adapter plates and respective interface structures, the first adapter plate receiving and retaining a first cargo container and the second adapter plate receiving and retaining a second cargo container, each of the first and second cargo containers having opposing rectangular side panels wherein the retention structure is configured to receive and retain the first adapter plate, interface structure and first cargo container with the opposing rectangular side panels being retained in a first orientation, the retention structure being further configured to receive and retain the second adapter plate, interface structure and second cargo container with the opposing rectangular side panels being retained in a second orientation different from the in first orientation.

* * * * *